(12) United States Patent
Ligatti

(10) Patent No.: US 10,367,817 B2
(45) Date of Patent: Jul. 30, 2019

(54) SYSTEMS AND METHODS FOR CHALLENGELESS COAUTHENTICATION

(71) Applicant: Jarred Adam Ligatti, Tampa, FL (US)

(72) Inventor: Jarred Adam Ligatti, Tampa, FL (US)

(73) Assignee: University of South Florida, Tampa, FL (US)

( * ) Notice: Subject to any disclaimer, the term of this patent is extended or adjusted under 35 U.S.C. 154(b) by 54 days.

(21) Appl. No.: 15/644,372

(22) Filed: Jul. 7, 2017

(65) Prior Publication Data

US 2018/0262505 A1    Sep. 13, 2018

Related U.S. Application Data

(63) Continuation-in-part of application No. 15/598,974, filed on May 18, 2017, which is a continuation-in-part
(Continued)

(51) Int. Cl.
*G06F 21/31*        (2013.01)
*H04L 29/06*        (2006.01)
(Continued)

(52) U.S. Cl.
CPC ............ *H04L 63/10* (2013.01); *G06F 21/40* (2013.01); *G06F 21/6281* (2013.01); *H04L 63/06* (2013.01); *H04L 63/0853* (2013.01); *H04L 63/102* (2013.01); *H04L 63/105* (2013.01); *G06F 2221/2103* (2013.01); *G06F 2221/2111* (2013.01); *H04L 2463/082* (2013.01)

(58) Field of Classification Search
CPC ..... H04L 63/10; H04L 63/0853; H04L 9/321; H04L 9/3234; H04L 9/3271; G06F 21/40; G06F 2221/2111

See application file for complete search history.

(56) References Cited

U.S. PATENT DOCUMENTS 6,591,265 B1    7/2003   Erickson et al.
7,434,257 B2   10/2008   Garg et al.
(Continued)

FOREIGN PATENT DOCUMENTS

WO    2014016619 A1    1/2014

OTHER PUBLICATIONS

Liao and Lee. A Novel User Authentication Scheme Based on QR-Code. Journal of Networks. 2010. vol. 5 (No. 8): 937-941.
(Continued)

*Primary Examiner* — Ali S Abyaneh
*Assistant Examiner* — Paul E Callahan
(74) *Attorney, Agent, or Firm* — Molly L. Sauter; Smith & Hopen, P.A.

(57) ABSTRACT

A system and method of authentication that avoids authentication challenges is described. In operation, an authenticator receives a first request to access a resource generated by a requestor and a participation message generated by a collaborator. The authenticator computing device then analyzes the first request and the participation message to determine whether the requestor requesting access to the resource should be granted access and grants the requestor access to the resource based upon the analysis of the first request to access a resource and the participation message.

22 Claims, 19 Drawing Sheets

Related U.S. Application Data of application No. 14/693,490, filed on Apr. 22, 2015, now Pat. No. 9,659,160.

(60) Provisional application No. 62/095,137, filed on Dec. 22, 2014.

(51) Int. Cl.
*G06F 21/40* (2013.01)
*G06F 21/62* (2013.01)

(56) References Cited

U.S. PATENT DOCUMENTS

| | | | |
|---|---|---|---|
| 7,805,606 B2 | 9/2010 | Birger et al. | |
| 8,286,227 B1 | 10/2012 | Zheng | |
| 8,627,438 B1 | 1/2014 | Bhimanaik | |
| 8,646,060 B1* | 2/2014 | Ben Ayed | H04L 63/0853 726/9 |
| 8,806,205 B2 | 8/2014 | Metke et al. | |
| 8,943,548 B2 | 1/2015 | Drokov et al. | |
| 9,380,058 B1 | 6/2016 | Ligatti et al. | |
| 2003/0120920 A1 | 6/2003 | Svensson | |
| 2006/0075222 A1* | 4/2006 | Moloney | H04L 63/0823 713/156 |
| 2006/0179304 A1 | 8/2006 | Han | |
| 2006/0212701 A1 | 9/2006 | Warwick | |
| 2009/0300364 A1 | 12/2009 | Schneider | |
| 2010/0281139 A1* | 11/2010 | Deprun | H04M 1/72522 709/219 |
| 2011/0219230 A1 | 9/2011 | Oberheide et al. | |
| 2013/0160083 A1 | 6/2013 | Schrix et al. | |
| 2013/0160135 A1 | 6/2013 | Seleznev et al. | |
| 2013/0254858 A1 | 9/2013 | Giardina et al. | |
| 2014/0143546 A1 | 5/2014 | McMurtry et al. | |
| 2014/0181955 A1 | 6/2014 | Rosati | |
| 2014/0259129 A1* | 9/2014 | Copsey | G06F 21/40 726/5 |
| 2014/0298421 A1 | 10/2014 | Johnson | |
| 2015/0067118 A1 | 3/2015 | Gatto et al. | |

OTHER PUBLICATIONS

Ni et al., D-algebra for composing access control policy decisions. Proceedings of the 4th International Symposium on Information, Computer, and Communications Security (ASIACCS '09). 2009: 298-309.

Samarati et al., Access Control: Policies, Models, and Mechanisms. Lecture Notes in Computer Science: Foundations of Security Analysis and Design. 2000. vol. 2171: 137-196.

Zhang and Parashar. Context-aware Dynamic Access Control for Pervasive Applications.

International Search Report and Written Opinion for PCT/US2015/027112 (filing date: Apr. 22, 2015) dated Sep. 22, 2015; Applicant: University of South Florida et al.

International Preliminary Report on Patentability for PCT/US2015/027112 (filing date: Apr. 22, 2015) with a priority date of Dec. 22, 2014; Applicant: University of South Florida et al.

International Search Report and Written Opinion for PCT/US16/36225 (filing date: Jun. 7, 2016) dated Aug. 30, 2016; Applicant: University of South Florida.

* cited by examiner

SYSTEMS AND METHODS FOR CHALLENGELESS COAUTHENTICATION

CROSS-REFERENCE TO RELATED APPLICATIONS

This application claims priority to currently pending U.S. patent application Ser. No. 15/598,974, entitled "Systems and Methods for Authentication Using Authentication Votes", having a filing date of May 18, 2017, which claims priority to U.S. Pat. No. 9,659,160, entitled "System and Methods for Authentication Using Multiple Devices", issued on May 23, 2017, which claims priority to U.S. Provisional Patent Application No. 62/095,137, entitled "Systems and Methods for Authentication Using Multiple Devices", having a filing date of Dec. 22, 2014, all of which are hereby incorporated by reference.

BACKGROUND

A traditional method of authentication may involve prompting a user for a username and password. However, such a method of authentication can be prone to error and can require the user to recall hard-to-remember passwords. Another traditional method of authentication may involve receiving a unique property of the user, such as a fingerprint, to identify a user. However, such a method of authentication can be vulnerable to discovery of the user property. For example, an attacker who obtains a fingerprint of a user (or a facsimile thereof) can then falsely log in as the actual user. Yet another traditional method of authentication may involve presentation of a token (e.g., smart card) issued to the authorized user. However, such a method of authentication can be attacked by stealing the token.

Additionally, the traditional methods of authentication known in the art do not take into account different user priorities when granting access to system resources. In prior art methods, the priority status of the other users of the system are not taken into account when granting access to a particular user of the system.

Accordingly, what is needed in the art is a system and method for authentication which takes into account unique user priorities and overcomes the deficiencies of the authentication systems and methods currently known in the art.

SUMMARY OF INVENTION

The present invention provides a system and method for authentication of one or more users utilizing authentication votes which overcomes the deficiencies of the prior art authentication systems, wherein access is granted to the one or more users. In various embodiments, the present invention provides a method of authentication which takes into consideration authentication votes received from one or more users, other than the user requesting access to the resource, to determine whether or not to grant access to the user.

In various embodiments, a method of coauthentication, wherein an authenticator determines whether to grant access based, at least in part, on the participation of one or more devices, is provided that avoids the use of authenticator challenges. The method includes, receiving, at an authenticator, a first request to access a resource generated by a requestor, receiving, at a collaborator, a second request to access a resource from the requestor and receiving, at the authenticator, a participation message generated by the collaborator in response to the second request to access a resource generated by the requestor. The method further includes, analyzing, at the authenticator computing device, the first request to access a resource and the participation message to determine whether the requestor should be granted access to the resource and granting the requesting user access to the resource when it is determined that the requesting user should be granted access to the resource based upon the analysis of the first request to access a resource and the participation message.

In one embodiment, the first request to access a resource generated by the requestor is transmitted directly from the requestor to the authenticator and the second request to access a resource generated by the requestor is transmitted directly from the requestor to the collaborator. The participation message generated by the collaborator is then generated by the collaborator in response to the second request to access a resource and is then transmitted from the collaborator to the authenticator.

In an additional embodiment, instead of directly transmitting the first request to access a resource to the authenticator, the participation message generated by the collaborator in response to the second request to access a resource is transmitted to the requestor and then the requestor transmits the participation message and the first request to access a resource from the requestor to the authenticator in response to receiving the participation message at the requestor.

In another embodiment, the first request to access a resource generated by the requestor is first transmitted to the collaborator and the collaborator then transmits the first request to access a resource generated by the requestor and the participation message to the authenticator.

In symmetric-key coauthentication embodiments, the authenticator and the requestor, the requestor and the collaborator and the authenticator and the requestor may each share private authentication keys.

In additional asymmetric-key coauthentication embodiments, the first request to access a resource, the second request to access a resource and the participation message are digitally signed and/or encoded.

The present invention additionally provides, one or more non-transitory computer-readable media having computer-executable instructions for performing a method of running a software program on a computing device, the method including issuing instructions from the software program. The instructions include receiving, at an authenticator, a first request to access a resource generated by a requestor, receiving, at a collaborator, a second request to access a resource from the requestor, and receiving, at the authenticator, a participation message generated by the collaborator in response to the second request to access a resource generated by the requestor. The instructions further include analyzing, at the authenticator computing device, the first request to access a resource and the participation message to determine whether the requestor should be granted access to the resource and granting the requesting user access to the resource when it is determined that the requesting user should be granted access to the resource based upon the analysis of the first request to access a resource and the participation message.

Additionally is provided an authentication system which includes, an authenticator computing device configured to receive a first request to access a resource generated by a requestor and a participation message generated by the collaborator in response to a second request to access a resource generated by the requestor. The authenticator computing device is further configured to analyze the first request to access a resource and the participation message to determine whether the requestor should be granted access to the resource and to grant the requesting user access to the resource when it is determined that the requesting user should be granted access to the resource based upon the analysis of the first request to access a resource and the participation message.

The present invention provides a system and method for authentication of a user to access a resource that does not require the use of authenticator generated challenges. The present invention thus overcomes the deficiencies of the authentication systems and methods currently known in the art.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE INVENTION

Figure 1:
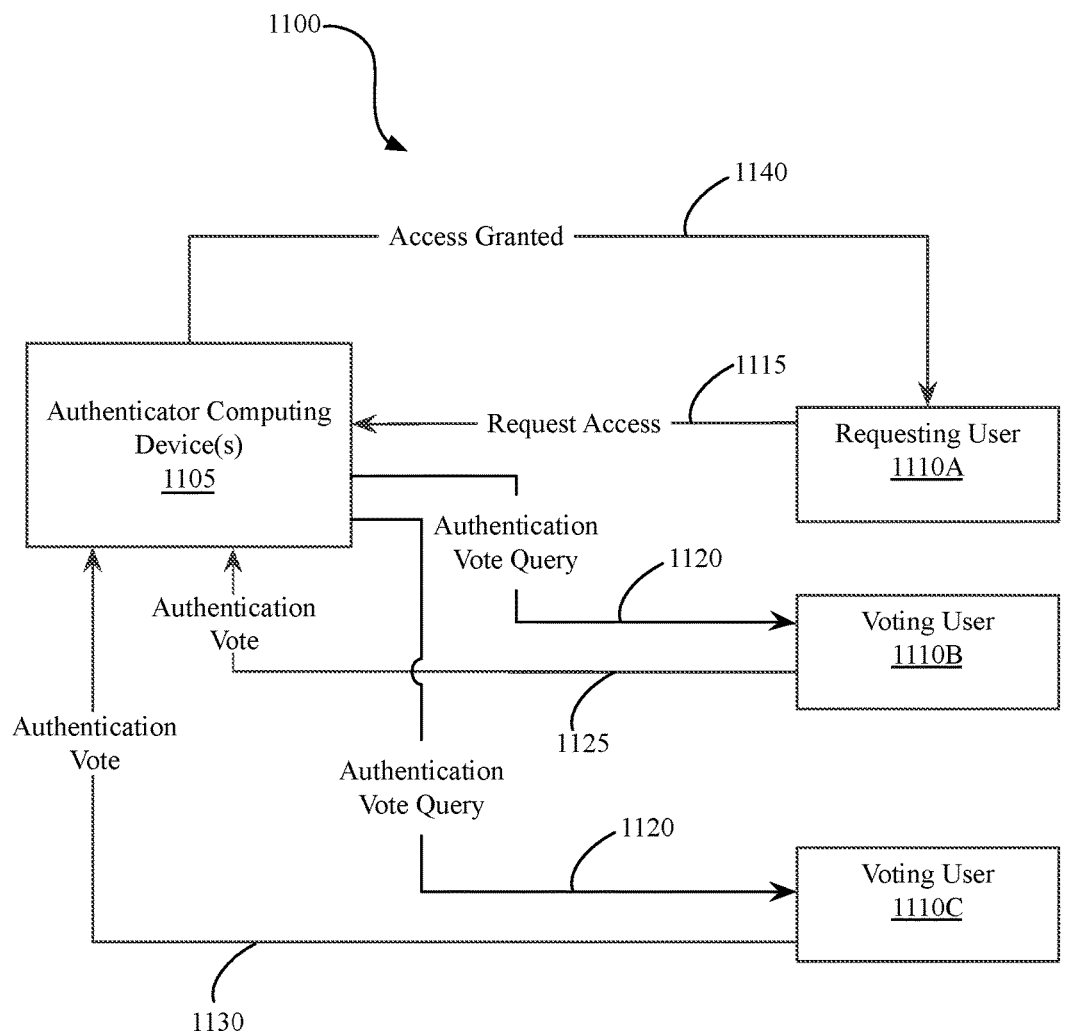
FIG. 1 is a block diagram illustrating a design overview of various embodiments of an authentication system implemented in a networked environment employing authentication votes, in accordance with an embodiment of the present invention.

In various embodiments, the present invention provides a system and method for authentication of one or more users utilizing authentication votes, wherein access is granted to the one or more users based upon the authentication votes cast by other users. As such, the present invention provides a system and method of authentication which takes into consideration authentication votes received from one or more users, other than the user requesting access to the resource, to determine whether or not to grant access to the user.

In an embodiment of the present invention employing authentication votes, collection and analysis of authentication votes cast by voting users may be employed in the authentication process of a requesting user. In some embodiments, one or more voting users may provide full or partial veto power during the authentication process of the requesting user. In general, in this embodiment, an authenticator computing device may receive a request from a requesting user to access a resource. The authenticator computing device may then query a subset of the voting users for authentication votes. The voting users could include all users enrolled for a specific service provided by the authenticator computing device or all currently logged-in users.

In various embodiments, an authentication vote may be an indication of whether and/or how to allow the requesting user access to a resource controlled by the authenticator computing device. In one embodiment, the authentication vote may be quantified. In various embodiments, the authentication votes may be cast automatically or by querying the voting devices. In one embodiment, the authenticator computing device, or another computing device, may serve as a proxy and users may or may not be able to control the authentication votes cast on their behalf by the proxy. In a specific embodiment proxy votes may be implemented through a proxy server.

In a particular embodiment for tiered users, the authenticator computing device may automatically cast authentication votes on behalf of the voting users, with higher-tier users automatically voting against lower-tier users, without providing the voting users with the ability to choose the authentication vote. For example, the queried subset of voting users could be all the currently logged-in users, or just the highest-paying, logged-in users, or all of the top-tier users that are currently logged-in, or possibly all the registered users, regardless of whether or not they are logged-in. The sum of the authentication votes cast by the voting users may determine whether or not the requesting client device will be granted access to the resource.

In a specific example, wherein a user is a superuser of the network and is therefore allocated dedicated network access, the authenticator computing device may consider the superuser's authentication vote, in response to an access request from another requesting user, to be negative infinity when the superuser is logged-in and when the superuser is not logged-in, the superuser's authentication vote is not counted.

In various embodiments, the subset of voting users could be queried in multiple steps, for example, by linearly traversing a user list (e.g., from highest-ranked to lowest-ranked user) until finding a voting user that returns a vote. The authenticator computing device may then determine whether and/or how to authenticate the requesting user based upon the authentication votes received from the voting users.

In an exemplary embodiment, each authentication vote received at the authenticator computing device may be a positive real number, a negative real number, positive infinity or negative infinity. In this embodiment, the authenticator computing device may sum the total of all the authentication votes received and if the sum is above a predetermined threshold value, the authenticator computing device may grant access to the requesting user. In various embodiments, the predetermined threshold might be equal to negative infinity, positive infinity, zero or a predetermined number of votes received. If the threshold is positive infinity or negative infinity, then specific rules may be implemented for summing the authentication votes. For example, negative infinity added to positive infinity may result in negative infinity, positive infinity or zero as predetermined by specific implementation rules. In addition, the number of authentication votes cast by the voting users may be dynamically changed.

In a simplified example, in response to a request to access a resource from a requesting user, the authenticator computing device may collect and sum the authentication votes from all other logged-in voting users and the authenticator computing device may then grant the request if the majority of votes received are "yes" votes. In various embodiments, the authentication votes may be weighted based upon particular characteristics of the users. For example, the top-tier (i.e. higher paying) users' authentication votes may be weighted more heavily than those of the lower-tier users.

The authentication method of the present invention employing authentication votes is effective in preventing authentication from occurring if a device having veto power is present during the authentication process. Applications of the method may be implemented by router owners who wish to deny lower priority users from consuming bandwidth when other, higher-priority, users are available. Similarly, when networking resources are scarce, some users may pay extra to have the veto power to prevent the lower-tier users from accessing the resources. In addition, the method may be implemented to prevent distractions in vehicles, theatres or other venues in an attempt to enforce user focus. As such, some features or systems (i.e. network connectivity) may not be available when user devices, such as phones, are present. For example, a system implemented in a vehicle may disable interaction with certain vehicle electronics when a driver's phone is present in the vehicle.

The authentication method of the present invention employing authentication votes may be used in combination with other authentication methods, such as username/password and fingerprint authentication methods, thereby implementing a two-step approach to authentication. With the two-step approach, the authenticator computing device may determine whether or not to grant access to a requesting user based on the validity of the username/password and on the authentication votes received. The process of verifying the username/password and collecting and summing authentication votes may be executed simultaneously or sequentially, and the steps may be performed in either order. In this two-step approach, the authenticator computing device may verify authentication in whichever order is most efficient and may immediately prevent authentication of the requesting user if either of the authentication steps fail.

In a specific embodiment, the authentication method of the present invention employing authentication votes may be combined with other authentication methods utilizing authentication challenges and responses to implement a two-step approach to authentication. In this embodiment, the authentication step utilizing authentication votes and the authentication step utilizing authentication challenges and responses may be executed concurrently or sequentially. The authenticator computing device may then allow authentication and grant the requesting user access to the resource if both steps are successful.

With reference to FIG. 1 shown is a block diagram illustrating a design overview and communication pathway of various embodiments of an authentication system 1100 utilizing authentication votes, as implemented in a networked environment. In this embodiment, the requesting user 1101A and the voting user 1110B can perform a task which includes a particular interaction between the requesting user 1110A, at least one of the voting users 1110B, 1110C, and the authenticator computing device 1105, to allow access to the requesting user 1110A. The authenticator computing device 1105 can be a secure system which the requesting user 1110A and the voting users 1110B, 1110C can access. In some embodiments, the requesting user 1110A, the voting users 1110B, 1110C, and the authenticator computing device 1105 can communicate over a network in the networked environment. Alternatively, the requesting user 1110A, the voting users 1110B, 1110C and the authenticator computing device 1105 can be configured to communicate without a network.

In particular, each of the users 1110A, 1110B, 1110C can be associated with one or more users devices which comprise a processor-based system, such as a computer system, a server computer, or any other system providing computing capability. The user devices associated with the users 1110A, 1110B, 1110C and the authenticator computing device 1105 can be employed or arranged, for example, in one or more server banks, computer banks, or other arrangements. The user devices associated with the users 1110A, 1110B, 1110C can comprise various components configured to be executed on the user device 1110A, 1110B, 1110C. For example, the components executed on the user device associated with the users 1110A, 1110B, 1110C can include applications, services, processes, systems, engines, or other functionality. Each user device associated with the users 1110A, 1110B, 1110C can include a display, such as, liquid crystal display (LCD) screens, gas plasma-based flat panel displays, organic light emitting diode (OLED) displays, electronic ink displays, or other types of display devices, etc.

In some embodiments, the user devices associated with the users 1110A, 1110B, 1110C can be embodied in the form of a laptop computer, personal digital assistants, cellular telephones, smart phones, music players, web pads, tablet computer systems, game devices, electronic book readers, or other devices with like capability. The devices can also be embodied as any mechanical structure comprising a processor-based system. In one embodiment, the devices can be configured to connect to a network. For example, the device can be a vehicle, such as a car, that can connect to a network to access the authentication system. As another illustrative example, the devices can be a lock on a door of a car, room, or house that comprises a processor-based system that can connect to a network. As another illustrative example, the devices can be a garage door or a road gate that comprises a processor-based system that can connect to a network. As another illustrative example, the devices can be a smart wearable device, such as a smart watch, a smart ring, smart glasses, or any smart apparel that a user can wear as an item of clothing or accessory that comprises a processor-based system and can connect to a network. For example, the devices can be jewelry/apparel, including rings, necklaces, glasses, watches, earrings, shirts, pants, coats, handkerchiefs, hats, bracelets, scarves, hairclips, shoes, or belts.

According to some embodiments, when a requesting user 1110A wants to access a resource, the authenticator computing device 1105 can perform an authentication challenge involving authentication votes from the voting users 1110B, 1110C. In this implementation, the requesting user 1110A sends a request access 1115 to the authenticator computing device 1105 requesting access to a resource controlled by the authenticator computing device 1105. The authenticator computing device 1105 then transmits an authentication vote query 1120 to one or more of the voting users 1110B, 1110C. The voting users 1110B, 1110C may then respond by each sending an authentication vote 1125, 1130 to the authenticator computing device. The authenticator computing device 1105 then analyzes the received authentication votes to determine whether or not to grant access to the requesting user 1101A.

Figure 2:
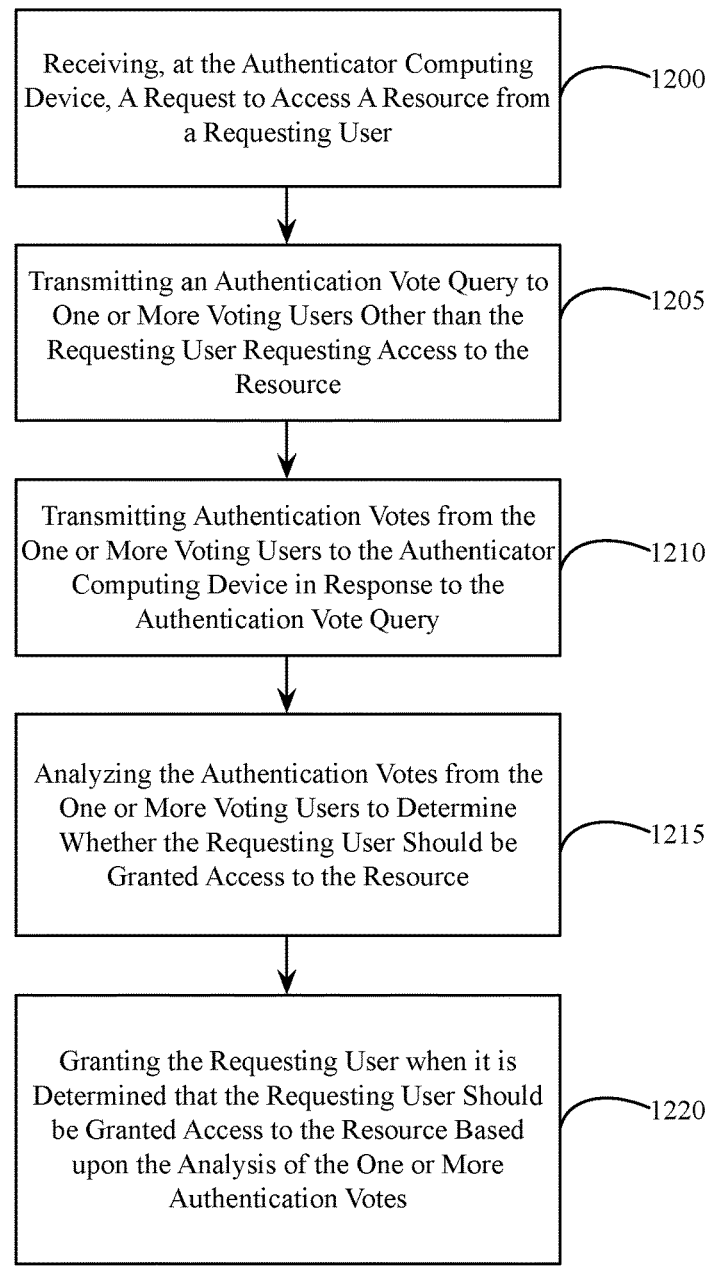
FIG. 2 is a flow diagram illustrating an example functionality implemented as a portion of the authentication system employing authentication votes, in accordance with an embodiment of the present invention.

FIG. 2 provides a flow diagram illustrating one embodiment of the authentication method of the present invention utilizing authentication votes. The method includes a first step 1200 of, receiving, at the authenticator computing device, a request to access a resource from a requesting user. In response to the request, the method further includes a second step 1205 of transmitting an authentication vote query to one or more voting users, which includes at least one user other than the requesting user. In response to the authentication vote query, the one or more user devices then respond in a third step 1210 by transmitting authentication votes to the authenticator computing device. In a next step 1215 the authenticator computing device analyzes the authentication votes to determine whether the user device requesting access to the resource should be granted access and in a final step 1220 the authenticator computing device then grants access to the user device requesting access to the resource based upon the analysis of the one or more authentication votes.

Figure 3:
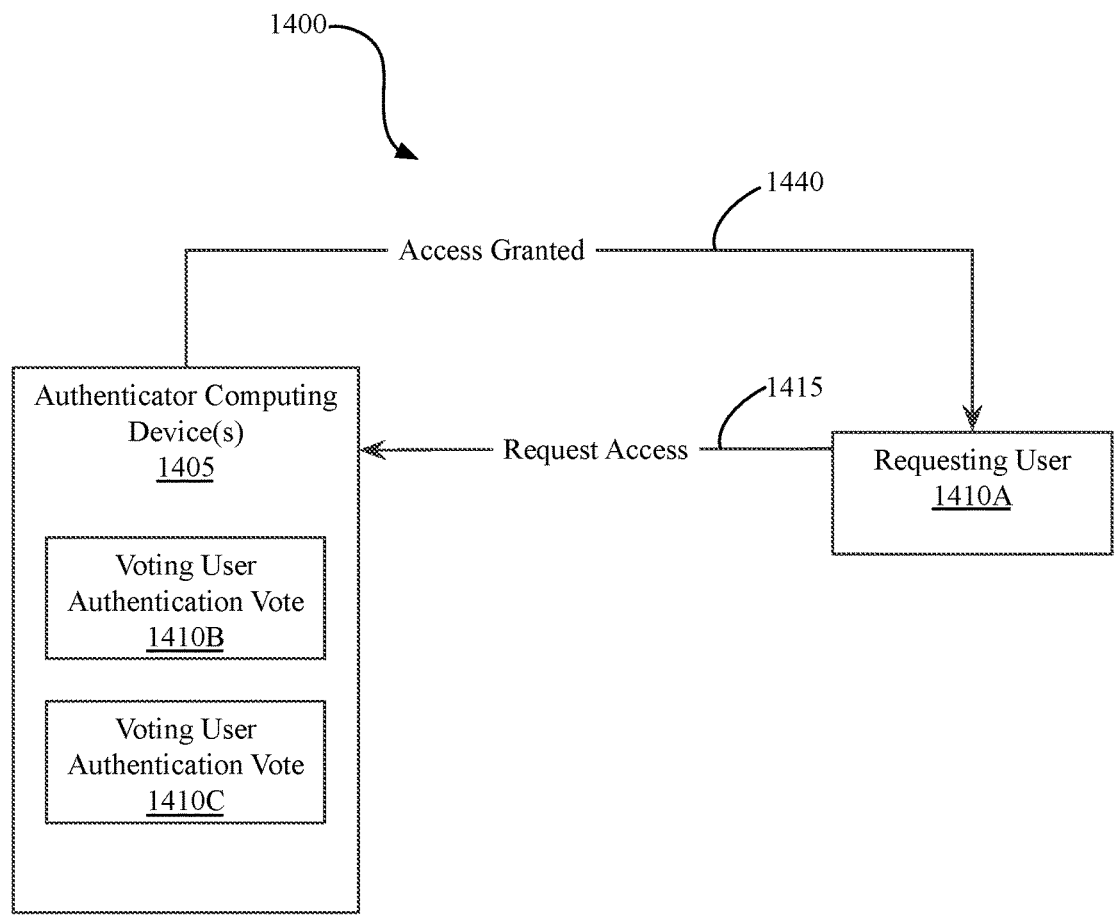
FIG. 3 is a block diagram illustrating a design overview of various embodiments of an authentication system implemented in a networked environment employing authentication votes cast by proxy, in accordance with an embodiment of the present invention.

In an additional embodiment 1400, shown in FIG. 3, the authenticator computing device 1405 may operate as a proxy to cast votes for the voting users, even when the voting users are not logged into the authenticator computing device 1405. In this embodiment, the requesting user 1410A sends a request 1415 to access a resource to the authenticator computing device 1505. In this embodiment, the authenticator computing device 1405 stores the voting users authentication votes 1410B, 1410C and the authenticator computing device 1405 acts as a proxy to cast the authentication votes for the voting users based upon the request 1415 from the requesting user 1410A. As in the previous embodiment, following the analysis of the authentication votes, the authenticator computing device 1405 then determines whether or not to grant the requesting user 1410A access to the resource.

In an additional embodiment, a proxy server, separate from the authenticator computing device 1405 could be implemented in the network system to cast authentication votes for the voting users 1410B, 1410C.

Figure 4:
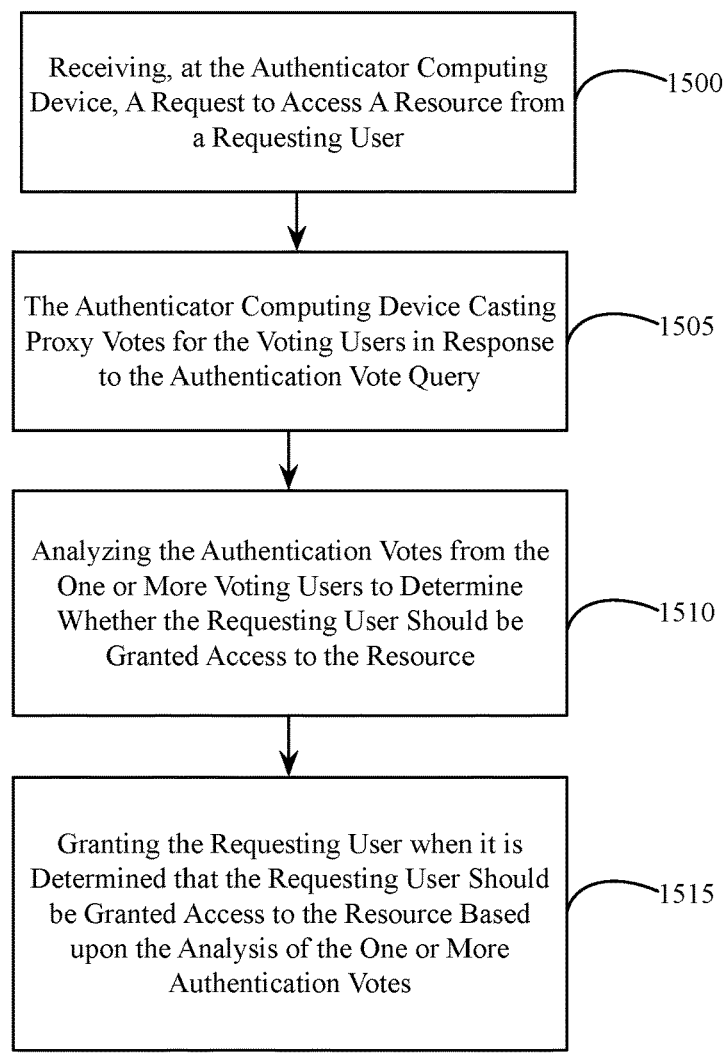
FIG. 4 is a flow diagram illustrating an example functionality implemented as a portion of the authentication system employing authentication votes cast by proxy, in accordance with an embodiment of the present invention

FIG. 4 provides a flow diagram illustrating an embodiment of the authentication method of the present invention wherein authentication votes are cast by proxy. The method includes a first step 1500 of, receiving, at the authenticator computing device, a request to access a resource from a requesting user. In response to the authentication vote query, the authenticator computing device then responds in a second step 1505 by casting the authentication vote of the voting users via proxy. In a next step 1510 the authenticator computing device analyzes the authentication votes to determine whether the user device requesting access to the resource should be granted access and in a final step 1515 the authenticator computing device then grants access to the user device requesting access to the resource based upon the analysis of the one or more authentication votes.

The authentication method previously described, which utilizes votes case by voting users to determine whether or not a requesting user should be granted access to a particular resources, can additionally be combined with additional methods of authentication which require a user to be associated with more than one device. In various embodiments, this additional authentication method involves requesting client devices and verifying client devices in addition to previously described requesting users and voting users. The following paragraphs describe in detail the additional authentication method of the present invention utilizing multiple devices registered to a requesting user.

The present disclosure describes systems and methods for authenticating "users" (which can be human users, devices, processes, clients, etc.). Authentication decisions can be based on the existence of cryptographic signatures from some set of devices (sometimes referred to as "tokens") associated with the user. During registration, the authenticator (e.g., an "authentication server") can associate devices with users and/or each other. This description therefore uses the term "registered" to mean "associated"; the devices "registered" with a user are "associated" with that user and/or with each other. Each device can have one or more associated cryptographic keys (which, in some embodiments, can be shared with the authenticator and/or other devices). Although the authenticator can associate a plurality of devices with each user, the associated devices need not store any data indicating or identifying the existence of other devices associated with the same user. Instead, the authenticator can associate multiple devices with each user and can thereafter require a valid cryptographic signature (or MACS, message authentication codes, or other valid responses) from some subset of a user's associated devices before authenticating that user.

According to some embodiments, the association of multiple devices with each user can prevent theft of devices. In particular, because some subset of devices associated with a user must participate in the authentication of the user, a theft-based attack can require the attacker to steal all the devices in the subset. For example, if a smart phone and smart watch are associated with a particular user and the verifier requires signatures from both of these devices before an access can be granted, then a theft-based attack would require stealing both the smart phone and smart watch.

Accordingly, the present disclosure describes systems and methods for verifying (i.e., authenticating) a device (i.e., the device's user) using at least one other device associated with the user. In particular, the present disclosure describes various embodiments of an authentication system that can comprise a verifier and at least two user devices, where the verifier and the user devices can communicate. In one embodiment, the authentication of the requesting device is performed using another device of the user that is in close proximity to the requesting device. The authentication system described herein can comprise a multitude of different user devices that are available in a networked environment and can be configured to be authenticated.

According to various embodiments, the authentication system can transmit an authentication challenge to a first device associated with a user. An authentication challenge can be a task, involving a second device, required to be completed in order to authenticate the first device. Similarly, the authentication challenge can comprise randomly generated data (i.e., a nonce) that the user must transmit to at least one other device, in order to be authenticated. A prover can refer to an entity who is executing the authentication challenge to prove the identity or validity of the first device. In other words, the prover can be the at least one other user device used to authenticate the requesting device.

According to various embodiments, a system for authenticating devices can comprise a verifier configured to receive a registration for multiple computing devices associated with a user and to determine whether to authenticate the requesting device. The authenticator can be, for example, a secure server comprising a data store configured to store the registration of multiple devices associated with multiple respective users. The verifier can be used to verify the identity of a user. In some embodiments, a user can register a first device by entering a user credential, such as an email address of the user, and a name for the first device. The user can also register a second device by entering the same user credential for the user and a name for the second device. To this end, the user can register multiple devices to be associated with the user credential. Each device registered with the user can be stored in the data store of the verifier. In one embodiment, the system can require the user to register the second device within a predetermined time period to prevent security attacks during the registration phase.

According to some embodiments, the authentication system can receive a request from the first device to access one or more resources, where a "resource" can, for example, be an application, file, process, port, service (such as opening a physical lock or connecting to a web service), network bandwidth, device, memory, and/or processor time. The system can determine if there are at least two devices registered with the user to perform the multiple device authentication. In response to determining that there are at least two devices associated with the user, the verifier can send an authentication challenge, possibly encrypted, to the first device desiring to access the resource. For example, the authentication challenge can be dynamically generated random data (e.g., a cryptographic nonce) that the second device can receive to authenticate the first device. The first device can send, possibly by broadcasting, the authentication challenge to the second device registered with the user.

In some embodiments, the second device can receive the authentication challenge from the first device. For example, the second device can take a picture of the authentication challenge that is displayed on the screen of the first device (e.g., as a barcode, such as a QR code). The second device, having received the authentication challenge, can transmit a response to the verifier. The verifier can then determine whether the second device is registered with the user. For example, the verifier can determine that the second device is registered under the same email address as the first device. After determining that the second device is registered with the user, the verifier can determine whether the response received from the second device is valid with respect to the authentication challenge transmitted to the first device. Upon determining that the response received from the second device is valid with respect to the authentication challenge transmitted to the first device, the authentication system can authorize access to the resource to the first device.

In one embodiment, the authentication challenge transmitted to the first device is a nonce encrypted using the first device's cryptographic public key, and a valid response from the second device is a version of said nonce signed with the second device's cryptographic private key. In such an embodiment, a valid response from the second device requires participation of both the first and second devices' private keys (the first device's private key being necessary to decrypt the nonce, so that the nonce can be transmitted to, and then encrypted and/or signed by, the second device). By requiring participation of both devices' private keys, a theft-based attack on the authentication system requires theft of both devices. In one embodiment, each device can store only its own private key. Other embodiments may incorporate additional devices, nonces, encryptions, decryptions, and signatures, as should be appreciated, to provide secure communications while assuring that a plurality of devices participate in the authentication of a first device.

Additionally, multiple devices can be associated with a user and the user may be required to use the devices to be authenticated and gain access to a resource. However, the user does not necessarily need to utilize all of the associated devices to gain access to a resource. While n devices can be associated with the user, a subset of m devices can be required to participate in responding to an authentication challenge (participation may include forwarding, decrypting, signing, and/or transmitting a challenge and/or response). In general, it is required that 2≤m≤n, wherein both n and m need to be greater than or equal to 2 and m needs to be less than or equal to n. As such, if an attacker is successful in acquiring m−1 devices, they will be unable to gain access to the resource or system, yet the user will still be able to gain access using only m devices. For example, assuming m=2 and n=3, a user having a smart phone, a smart ring, and a smart watch can forget the smart phone at the office, yet still be able to gain access to their house by authenticating to the house's smart lock using the smart ring and smart watch. At the same time, an attacker who steals the user's smart phone will not have the required m=2 devices needed to open the house's smart lock. Thus, a level of robustness of usability, resulting from the redundancy of devices, is provided, and by choosing m and n appropriately, users can obtain both usability and security.

While more than two devices can be associated with a user, instead of using all associated devices, the user can use a specific set of devices during the authentication process. Therefore, the authentication system can request responses from different subsets of associated devices at each authentication attempt.

Device association can also be shared among users, and a device can be associated with multiple users. For example, a first user can be associated with a first smart phone and a first smart watch and a second user can be associated with the first smart phone and a second smart watch. Both the first user and the second user can access the authentication system by using the shared first smart phone and their respective associated devices. As such, even if an attacker has access to the first smart phone, they will still be unable to authenticate as the first user and as the second user.

In a specific embodiment of the invention, a system and method are provided for anonymously authenticating a user requesting access to a resource. In this embodiment, during registration, the authenticator (e.g., an "authentication server") can establish an associated set of user devices and can associate each of the user devices of the associated set of user devices with more than one user. The authenticator can then grant access to a requested resource to any user associated with the associated set of user devices using at least two user devices of the associated set of user devices. In this way, anonymous authentication is provided to a user requesting access to a resource by granting access to all of the users within the associated set of user devices. Once authenticated, a device has the same access level as allowed for any device in the associated set. This method provides anonymity and plausible deniability to the user because the authenticator does not know exactly which user has been authenticated, only that multiple of the devices in one associated set of devices successfully responded to the authentication challenges. In other words, instead of associating multiple user devices with one user, multiple devices could be associated with multiple users. In a multi-user environment, any one of the users can access the system by using these devices. Hence, the system doesn't know which specific user requested or was granted access, so the authentication becomes anonymized, and the authenticated user device has plausible deniability.

Anonymous authentication requiring two user devices of an associated set of user devices can be useful in various scenarios, such as for the purpose of verifying that a user is a member of a neighborhood crime reporting group, without specifically identifying the neighbor, to allow for the anonymous reporting of crime tips. Anonymous authentication has additional practical application in similar scenarios involving company or government whistleblower or anonymous sources for news, undercover agent reporting without specific identification of the agent and anonymous feedback from students, employees, etc.

Additional practical applications include providing services to authenticated members of organizations, such as companies or universities providing free shuttle or bus services to their employees or students, without tracking or ever determining the specific individuals using those services.

The systems and methods disclosed herein can avoid the cost of general security tokens by using devices already possessed by the user. Therefore, the systems and methods disclosed herein can be easily deployable. All devices registered with a user can be granted a private key, or can create their own private key, during the registration phase. In this regard, if one device registered with a user is stolen, the attacker still needs the private key of at least one other device registered by the user to authenticate the stolen device.

Figure 5:
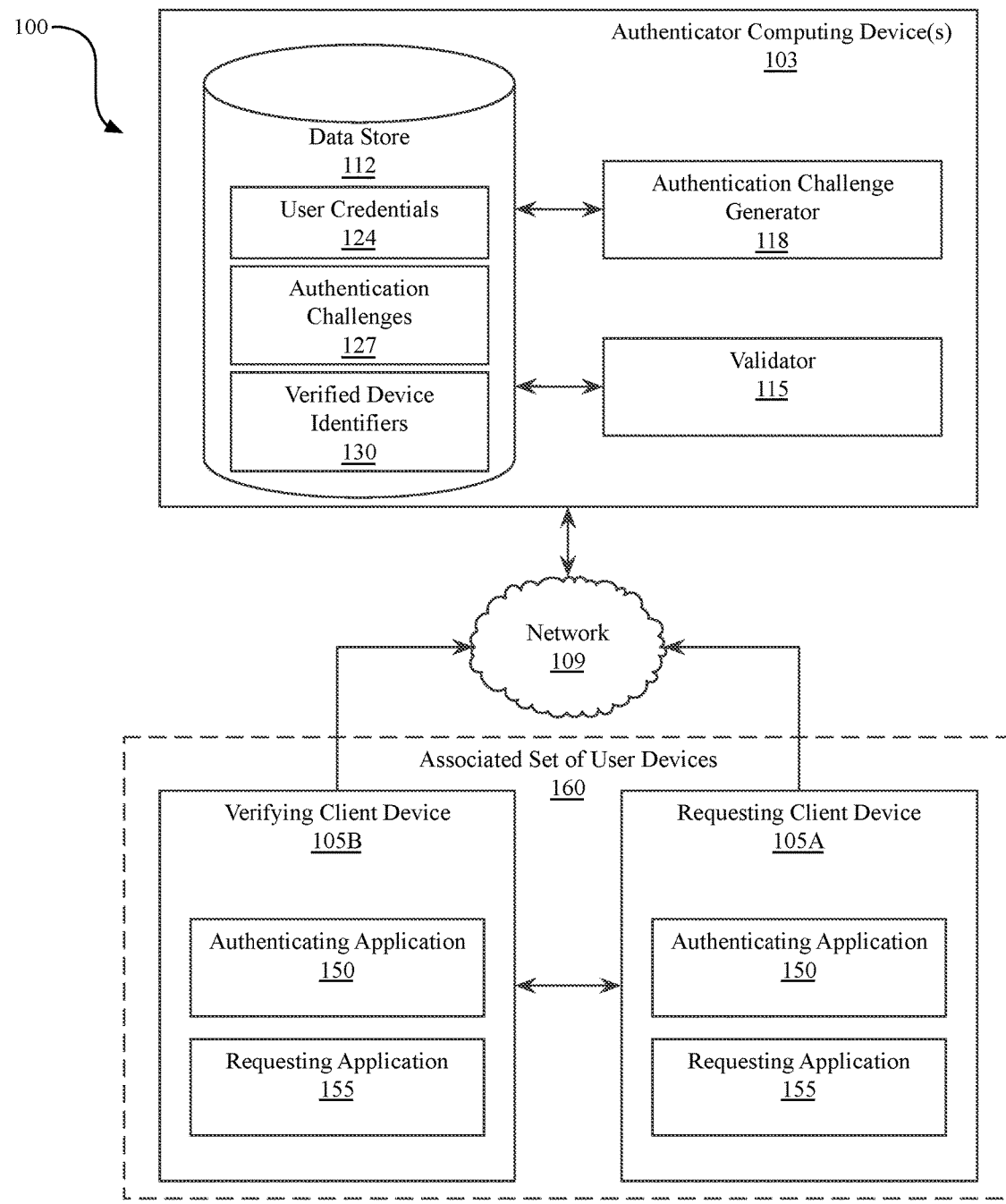
FIG. 5 is a block diagram illustrating a design overview of various embodiments of an authentication system implemented in a networked environment, in accordance with an embodiment of the present invention.

With reference to FIG. 5, shown is a block diagram illustrating design overviews of various embodiments of an authentication system 100 implemented in a networked environment. The authentication system 100 can comprise an authenticator computing device 103, a requesting client device 105A, a verifier client device 105B, network 109, and/or other components. The requesting client device 105A and the verifier client device 105B, also referred to hereinafter as devices 105, can each belong to a user. That is to say, the devices 105 can be trusted devices registered with the authentication system 100.

The authenticator computing device 103 can comprise a validator 115, an authentication challenge generator 118, and/or other elements, such as other hardware and software, for implementing processes or algorithms. The validator 115 can be configured to perform the actual validation test. That is to say, the validator 115 can be configured to determine whether an authentication challenge sent to the requesting client device 105A matches a response received from the verifying client device 105B. Based on the result of that determination, the validator 115 can determine whether or not to authenticate the requesting client device 105A. In addition, the authentication challenge generator 118 can be configured to generate the authentication challenge sent to the requesting client device 105A. Either the authentication challenge generator 118 and/or the validator 115 can be configured to store the authentication challenge 127 sent and received in the data store 112 along with a corresponding verified device identifier 130.

The authenticator computing device 103 can also comprise a data store 112 configured to store user credentials 124, authentication challenges 127, verified device identifiers 130, and/or other data values. The user credentials 124 can comprise data regarding the devices 105 associated with each user. For example, user credentials 124 can comprise a username, password, email address, security questions and answers, and/or any other data related to a user with a registered client device 105. The authentication challenges 127 can comprise the authentication challenges sent to the requesting client device 105A and received from the verifying client device 105B. In one embodiment, the authentication challenges 127 can comprise encrypted and/or plaintext data that have been sent to the requesting client device 105A and/or received from one or more verifying client devices 105B. The verified device identifiers 130 can comprise data regarding devices 105 that a user has registered with the authenticator computing device 103. For example, when a user registers a device 105, the user can be prompted to enter a device name. The device name can be stored as a verified device identifier 130 in the data store 112.

The components of the authenticator computing device 103 can be distributed among several devices, which combine to perform the actions of the authenticator computing device 103. Similarly, the components of a requesting client device 105A can be distributed among several devices, which combine to act as a requesting device 105A and the components of a verifying client device 105B can be distributed among several devices, which combine to act as a verifying client device 105B.

In some embodiments, the requesting client device 105A can be the device requesting authentication to access an application. The verifying client devices 105B can be the device(s) that the requesting client device 105A must communicate with to authenticate the requesting client device 105A. In one embodiment, the client devices 105 must be in proximity to one another to complete authentication successfully. Alternatively, the client devices 105 must only be able to communicate with one another to successfully complete authentication.

In a specific embodiment, the requesting client device 105A and the verifying client device 105B may belong to an associated set of client devices 160. In this embodiment, anonymous authentication of a user of a client device of the associated set of client devices 160 is provided by associating the client devices with multiple users and by using two or more of the client devices in the associated set of client devices 160 to anonymously authenticate the user.

Figure 6:
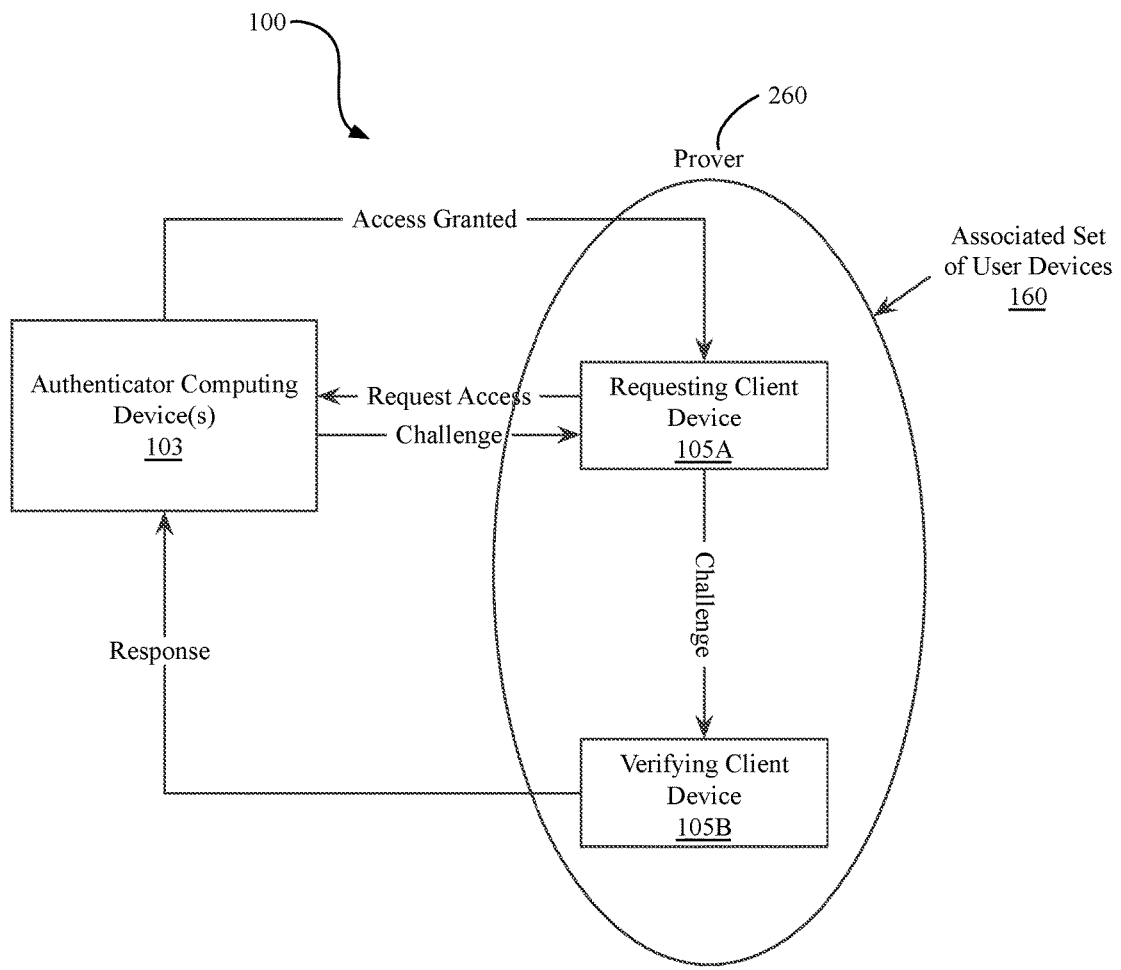
FIG. 6 is a block diagram illustrating a design overview of various embodiments of an authentication system implemented in a networked environment, in accordance with an embodiment of the present invention.

With reference to FIG. 6, shown is another block diagram illustrating a design overview and communication pathway of various embodiments of an authentication system 100 implemented in a networked environment. The requesting client device 105A and the verifying client device 105B can perform a task, otherwise referred to herein as a authentication challenge, which includes a particular interaction between the requesting client device 105A and the verifying client device 105B to prove the identity of the user and/or the requesting client device 105A. The authenticating computing device 103 can be a secure system which the user of requesting client device 105A and the verifying client device 105B can access. In some embodiments, the requesting client device 105A, the verifying client device 105B, and the authenticator computing device 103 can communicate over a network in the networked environment, as shown in FIG. 5 and FIG. 6. Alternatively, the requesting client device 105A, the verifying client device 10511, and the authenticator computing device 103 can be configured to communicate without a network. As shown in FIG. 6, the requesting client device 105A and the verifying client device 105B can together be embodied as the prover 260 of the authentication system 100.

In particular, each of the devices 105 can comprise a processor-based system, such as a computer system, a server computer, or any other system providing computing capability. The devices 105 and the authenticator computing device 103 can be employed or arranged, for example, in one or more server banks, computer banks, or other arrangements. The devices 105 can comprise various components configured to be executed on the device 105. For example, the components executed on the device 105 can include applications, services, processes, systems, engines, or other functionality. Each device 105 can include a display, such as, liquid crystal display (LCD) screens, gas plasma-based flat panel displays, organic light emitting diode (OLED) displays, electronic ink displays, or other types of display devices, etc.

In some embodiments, the devices 105 can be embodied in the form of a laptop computer, personal digital assistants, cellular telephones, smart phones, music players, web pads, tablet computer systems, game devices, electronic book readers, or other devices 105 with like capability. The devices 105 can also be embodied as any mechanical structure comprising a processor-based system. In one embodiment, the devices 105 can be configured to connect to a network. For example, the device 105 can be a vehicle, such as a car, that can connect to a network to access the authentication system 100. As another illustrative example, the device 105 can be a lock on a door of a car, room, or house that comprises a processor-based system that can connect to a network. As another illustrative example, the device 105 can be a garage door or a road gate that comprises a processor-based system that can connect to a network. As another illustrative example, the device 105 can be a smart wearable device, such as a smart watch, a smart ring, smart glasses, or any smart apparel that a user can wear as an item of clothing or accessory that comprises a processor-based system and can connect to a network. For example, the device 105 can be jewelry/apparel, including rings, necklaces, glasses, watches, earrings, shirts, pants, coats, handkerchiefs, hats, bracelets, scarves, hairclips, shoes, or belts.

According to some embodiments, when a user wants to access a resource from the requesting client device 105A, the authentication system 100 can require the user to perform an authentication challenge. This authentication challenge can be, for example, to transmit a particular random number from the requesting client device 105A to the verifying client device 105B. This pseudo random number can be generated by the challenge generator 118, and then transmitted from the authenticator computing device 103 to the requesting client device 105A. The pseudo random number can then be transmitted to the verifying client device 105B and back to validator 115 of the authenticator computing device 103. The validator 115 can determine whether the number received from the verifying client device 105B matches the number transmitted to the requesting client device 105A. This random number can be dynamically generated, such as a nonce or a one-time password (OTP). In the embodiment shown in FIG. 5 and FIG. 6, the set of devices 105 which can be used to perform the authentication per user has been reduced to two devices 105 for simplicity.

In some embodiments, the resource that the user of the requesting client device 105A is requesting access to can require a pre-determined number of verifying client devices 105B to be used in authenticating the requesting client device 105A. For example, if the user of the requesting client device 105A is requesting access to a mobile application that displays confidential information related to a bank account of a user, the application can require that the user of the requesting client device 105A have three or more registered verifying client devices 105B capable of communicating with the requesting client device 105A that the user wants to access with the application. To this end, a user can register any number of devices 105 with the system. In one embodiment, the prover can include an n number of trusted devices 105 associated with a user (where n is at least two). Therefore, an application can also require any number of verifying client devices 105B to be used in response to the authentication challenge presented for authentication.

Moreover, the authentication system 100 can be an efficient method of authenticating a user for applications that require frequent re-authentication. For example, suppose a user opens a loan repayment application on a mobile device of the user. The application can require the user to frequently re-authenticate the mobile device due to the sensitive nature of the information displayed by the application. In this way, the user can easily re-authenticate the mobile device using another registered verifying client device 105B. In the same way, multiple device authentications via the authentication system 100 is relatively more secure than traditional methods of re-authentication, also known as continuous authentication, because it requires multiple devices 105 registered to a user to be able to communicate with each other during the entire session. In one embodiment, the authentication system 100 can require multiple devices 105 registered with a user to be in proximity to each other during the entire session.

In some embodiments, the authenticator computing device 103 can lock out and force the use of a recovery path (to re-register device(s)) after a pre-defined threshold number of consecutive bad attempts. The pre-defined threshold number of consecutive bad attempts can depend on the reason an attempt was bad, e.g., "took too long to reply" or "didn't reply" or "returned invalid response to authentication challenge". In one embodiment, the pre-defined threshold number of consecutive bad attempts can be higher for "taking too long to reply" or "didn't reply." In another embodiment, the pre-defined threshold number of consecutive bad attempts can be smaller for "returned invalid response to authentication challenge."

Next, a general description of the operation of the various components of the networked environment comprising the devices 105 is provided. In an embodiment where a user registers at least two devices, a user can register the at least two devices 105 belonging to the user with the authentication system 100. For example, the user can register a pair of smart glasses by first entering an email address of the user and a device name of the smart glasses via a user interface of the smart glasses. In one embodiment, once the user registers the smart glasses with the authentication system 100, the user interface of the smart glasses will prompt the user to register at least one verifying client device 105B belonging to the user within a defined time limit, for example, of about five minutes. In this way, the user has five minutes to register another device 105. The user can, for example, register a smart watch belonging to the user by entering the email address of the user and a device name for the smart watch via a user interface of the smart watch within the defined time limit. Once the user has registered these two devices 105, the authentication system 100 can store the device names of the smart glasses and the smart watch in association with the email address of the user in a data store, for example, in the authenticator computing device 103.

Suppose that at a later time, the user wishes to access an application on the smart watch of the user where the application requires the user to login. The application can execute the login via the authentication system 100. In one embodiment, the authenticator computing device 103 can automatically send an authentication challenge to the smart watch. Alternatively, the user can request an authentication challenge from the authenticator computing device 103 via a user interface on the smart watch. In either case, the application can prompt the user to login by broadcasting the authentication challenge data (e.g., a nonce) to the paired device (smart glasses) via the display of the smart watch. The authentication challenge data can be displayed as a QR code on the screen of the smart watch, for example.

The user can take a picture of the QR code displayed on the smart watch using a camera of the smart glasses. It should be appreciated that the smart glasses can receive the broadcasted in any manner of communication enabled between the smart watch and the smart glasses. The smart glasses can then automatically transmit the picture of the authentication challenge data to the authenticator computing device 103 to verify the identity of the user of the smart watch. If the authenticator computing device 103 determines that the response received from the smart glasses matches an expected response for the authentication challenge sent to the smart watch, then the user can be granted access to the application. In this way, the user will have successfully logged into the application.

In this regard, the smart glasses can comprise an application to facilitate the authentication process. For example, the user can initiate an application configured to automatically transmit a received authentication challenge, as a response, to the authenticator computing device 103. Alternatively, the user can manually transmit a received authentication challenge, as a response, to the authenticator computing device 103.

As another illustrative example, suppose the user owns a smart ring that comprises a near field communication ("NFC") antenna, NFC transmitter, NFC chip, and/or any other component such that the smart ring is capable of NFC. Suppose the user also owns a mobile telephone also comprising an NFC antenna, NFC transmitter, NFC chip, and/or any other component such that the mobile telephone is capable of NFC. Therefore, the smart ring and the mobile telephone can communicate with each other via NFC. The user can register both the smart ring and the mobile telephone in accordance with the process described herein.

The mobile telephone of the user can comprise an application that is capable of authenticating the user via the authentication system 100. The user of the mobile telephone can open the application which requires the user to login. The mobile telephone can comprise a user interface displaying a randomly generated authentication challenge received from the authenticator computing device 103 that can be broadcasted to the smart ring via NFC. If the user is wearing the smart ring while the user is trying to log in to the application on the mobile telephone, the user can simply open up the authentication application on the smart ring, if necessary, and receive the broadcasted authentication challenge data on the smart ring via NFC. The authentication application on the smart ring can automatically transmit the authentication challenge data received in the smart ring to the authenticator computing device 103. Alternatively, the smart ring can transmit a signed version of the authentication challenge data to the smart phone, which then forwards the signed authentication challenge data to the authenticator computing device 103. The authenticator computing device 103 can compare the authentication challenge sent to the mobile telephone to the response received from the smart ring and/or smart phone. If the response is valid for the authentication challenge (e.g., the response is determined to be an appropriately signed version of the authentication challenge data), then the user will be logged into the application on the mobile telephone and granted access to the requested resource. If the response is not valid for the authentication challenge (e.g., the response is determined not to be an appropriately signed version of the authentication challenge data), then the user can be notified of an authentication failure on the user interface of the mobile telephone.

As another illustrative example, a user can have access to all registered devices 105 on his or her person (e.g., a phone, ring, watch, etc.). When the user gets into close proximity with a lock (e.g., hotel room, car door, office door, garage door, etc.), the data communication can happen automatically. In this example, the lock can be embodied as the requesting client device 105A, and at least one of the registered devices 105 on his or her person can be embodied as the verifying client device 105B. For example, one of the registered devices 105 on the user can automatically initiate communication with the lock once the devices 105 come within a threshold proximity to the lock. Once the communication is initiated, the authentication protocol can automatically be executed with or without any user involvement. The user wearing the verifying client device 105B can simply hold the verifying client device 105B and/or stand within the threshold proximity of the lock as the authentication challenge data is transmitted from the authenticator computing device 103, to the lock, to the verifying client device 105B, and back to the authenticator computing device 103.

Alternatively, the lock can act as the authenticator 103, in a system in which the user is in possession of a plurality of devices (e.g., a smart ring and a smart military necklace, a smart "dog tag") on his or her person. When the user comes within a threshold proximity to the lock, the smart ring may initiate the authentication protocol with the lock by requesting access (i.e., requesting that the lock be opened). In response, the lock sends an authentication challenge to the smart ring. The smart ring then sends the authentication challenge to the smart necklace, which may then respond directly to the lock (or indirectly via the smart ring). In this embodiment, the protocol may execute automatically, without user involvement, based on proximity to the lock. Also, in this embodiment, the smart ring acts as the requesting client device 105A, and the smart necklace acts as the verifying client device 105B. A theft-based attack in this embodiment would require stealing both the ring and necklace.

Similarly, the authentication system and methods described herein can be used between two or more drones that are in proximity to one another. For example, suppose one drone, embodied as the requesting client device 105A, is requesting access to a resource that requires authentication using another verifying client device 105B. Therefore, if another registered device, for example another drone, is within a threshold proximity of the drone requesting access to the application, then the drones may automatically perform the authentication challenge to authenticate the requesting drone.

Additionally, a set of users/entities drones, robots, soldiers, etc. can access a resource as one group, wherein each entity is itself a device. The group can be authenticated through response from a subset of these entities and the authentication can proceed absent human intervention.

Yet another embodiment can relate to theft security of devices 105 and/or accessing data from devices 105. For example, suppose a user owns a car that can be a smart car paired with a smart phone. The car can contain an in-car navigation or in-car entertainment system, for example, that requires the smart phone for access. The in-car navigation or in-car entertainment system can comprise sensitive information regarding the user. According to some embodiments, the in-car navigation or in-car entertainment system can be set up such that it has to be authenticated with another device 105 of the user, such as the smart phone, prior to operation. Therefore, a thief will not be able to authenticate the in-car navigation or in-car entertainment system unless the thief also stole the user's smart phone. In situations where the in-car navigation or in-car entertainment stores private data of the user, such as a home and work address, times of day when the victim is not home, etc., implementing multiple device 105 authentications can protect such sensitive information.

In one embodiment, the user can be required to first register at least two different devices 105 in a defined time interval to prevent attacks during the registration process. In particular, the time between registering each of the devices 105 must be less than the defined time interval. In order to authenticate a particular user, the system can require the user to enter a minimum amount of information, such as a user credential and a device name. In one embodiment, the user credential can be an email address that identifies a particular user in the database. The number of devices 105 a user registers can be a choice based on the requirements of the authenticator, which may base its requirements on the particular resources that may be accessed. In one embodiment, registering a device 105 can only be performed one time, and a user cannot unregister a device 105. For example, when a user registers two devices 105, none of them can be deleted from the system.

In another embodiment, the registered devices can be removed and new devices can be associated (registered) with a user. To remove or add a registered device, in-band or out-of-band communications could be used. With the in-band communication channel, a user can login to the system and then unregister or add devices. With the out-of-band communication channel, a user can unregister or add devices similarly to the registration phase, i.e., through other channels, such as calling or visiting a registration specialist in-person.

Additionally, the authentication system can be utilized to implement parental controls into a device. For example, gaining access to a television can be subject to an authentication to allow only authorized users. As such, access to some television channels can also require an authentication, such as the presence of a parent's smart ring. Similar concepts apply to various other parental-control systems.

According to various embodiments, when the authenticating application 150 launches in the requesting client device 105A, if the requesting device 105A has not been associated with any verifying devices 105B, then a device registration process may be initiated. The device registration process can occur by prompting the user via a user interface to enter an email address (the validity of this email is checked by a regular-expression pattern) and a device name (or identifier). In one embodiment, the email address can be stored in the user credentials 124 of the data store 112, and the device name can be stored in the verified device identifiers 130 of the data store 112. Emails are unique and can represent the users in the system and the device names are used to identify user's devices. A possible attack could occur between the registration of the requesting client device 105A and the verifying client device 105B. Therefore, the authentication system 100 can require the use of the defined time interval, which forces the user to register a verifying client device 105B within a certain amount of time, according to one embodiment. If the user does not register the verifying client device 105B within the defined time interval, the email will be invalid and will be unusable.

In one embodiment, once the user registers the requesting client device 105A, the verifying client device 105B needs to be registered with the same email and a different device name which can allow the authenticator computing device 103 to identify the user's different devices 105 If the device name is the same as the previous one, the device 105 cannot be registered. The server then creates a randomly generated nonce or One-Time Password (OTP) and sends it to the email address provided by the user. The user can be prompted to enter this password via the user interface in order to register the verifying client device 105B. In one embodiment, by virtue of receiving the OTP confirmation, the authentication system 100 assumes that the two devices 105 paired belong to the same user because the user got the OTP by accessing the email of the user corresponding to the email address. In this way, the user already has access to the email account given, and the two devices 105 paired.

In one embodiment, the authenticator computing device 103 can check whether the email address is already registered. In particular, the authenticator computing device 103 can search through the data store within the authenticator computing device 103, for example, to determine whether the email address received from the device 105 requesting access to the application is stored. Second, the authenticator computing device 103 can determine whether the devices 105 have been registered in association with that email address. Third, the authenticator computing device 103 can determine whether the signatures and/or or names of the devices 105 stored in association with that email address corresponds to the name of the device 105 received from the device 105 requesting access to the application.

The authenticator computing device 103 can retrieve the user credentials 124 and verified device identifiers 130 associated with each device 105 that the user is registering. For each registered device 105, a pair of private/public keys can be generated by that device. The authentication system 100 can use the public key of each of the devices 105 in order to identify which device 105 is accessing the system and also to encrypt the data sent to, and decrypt the data received from, these devices 105.

In some embodiments, the user need not previously register any devices with the authentication system 100. In one embodiment, the authentication system 100 can be configured to automatically determine that a user associated with the requesting client device 105A is the same user that is associated with the verifying client devices 105B. For example, the authenticator computing device 103 can be configured to automatically retrieve user data from the requesting client device 105A and the verifying client devices 105B. Thereafter, the authenticator computing device 103 can compare the data to determine whether the user associated with the requesting client device 105A is the same user that is associated with the verifying client device 105B.

Alternatively, the registration and the authentication phases of the authentication system 100 can happen simultaneously. For example, when a user has not previously registered any devices with the authentication system 100, a requesting client device 105A may be prompted to enter user credentials and a device name upon requesting access to a resource. Thereafter, the verifying client device 105B, upon sending a response back to the authenticator computing device 103, can also be prompted to enter user credentials and a device name. In this situation, the authenticator computing device 103 can be configured to first determine whether the user credentials match before determining whether the authentication challenge sent and the response(s) received match. In yet another embodiment, the authentication system 100 can be configured such that any device can be used as the verifying client device 105B, regardless of whether the verifying client device 105B belongs to the requesting user, as long as that device 105B can be associated (i.e., registered) with the requesting user.

Once the devices 105 of the user are registered, a user can be authenticated via the authentication system 100. To identify the user, the server can generate a random value (nonce) and compute a QR code of this value. This QR code can be sent to the user requiring access. Then, the user can take a picture of this QR code by using the verifying client device 105B which will send back the value, the name of the device 105, and the user's email address to the authenticator computing device 103. If everything sent matches with the data on the authenticator computing device 103, the user is granted access to the system.

In an additional embodiment for providing anonymous authentication, the requesting client device 105A and the verifying client device 105B may be members of an associated set of client devices 160 and each of the client devices in the associated set of client devices is associated with more than one user. In this embodiment, the requesting client device 105A sends a request to access to an authenticator computing device 103. The authenticator computing device 103 does not know which user has requested access to the resource because more than one user is associated with the requesting client device 105A. The authenticator 103 responds to the request by sending an authentication challenge to the requesting client device 105A. The requesting client device 105A then forwards the challenge to the verifying client device 105B and the verifying client device 105B sends the response to the authenticator 103. If the authenticator 103 determines that the response from the verifying client device 105B is a valid response, then the authenticator authenticates the associated set of client device 160. With this method, anonymity of the requesting client device 105A is maintained.

Figure 7:
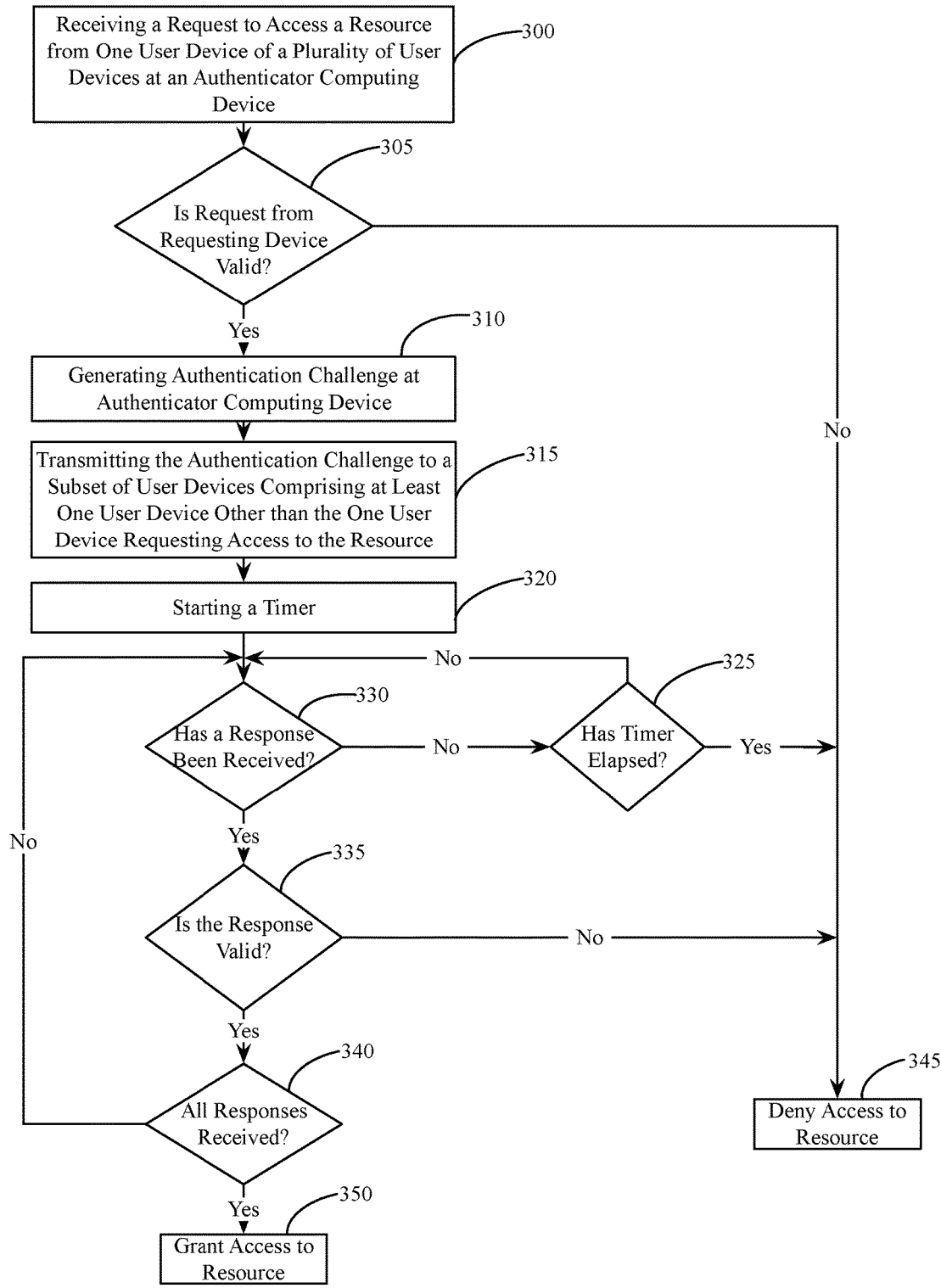
FIG. 7 is a flow diagram illustrating an example functionality implemented as a portion of the authentication system, in accordance with an embodiment of the present invention.

With reference to FIG. 7, shown is a flow chart that provides one example of functionality that may be implemented in the authenticator computing device 103, according to an embodiment of the present disclosure. Alternatively, the flow chart of FIG. 7 can be viewed as depicting steps of an example of a method implemented in the authenticator computing device 103 to authenticate the requesting client device 105A using the verifying client device 105B. In particular, the flow chart depicted in FIG. 7 shows how the authenticator computing device 103 determines whether to grant the requesting client device 105A access to resources.

With reference to FIG. 7, the method of the present invention may include receiving a request to access a resource from a user device of a plurality of user devices at an authenticator computing device 300. The method may then continue by determining whether the request from the user device is valid 305. If the request is not valid, the user device may be denied access to the resource 345. If the request is valid, the authenticator computing device may generate an authentication challenge in response to the request 310. The authentication challenge may then be transmitted to a subset of user devices of the plurality of devices associated with the requesting device and/or its user 315, and a timer may be started 320. The subset of user devices comprises at least one user device that is not the user device requesting access to the resource. As the timer is running, the authenticator computing device may determine whether a response to the authentication challenge has been received 330 from any of the user devices in the subset of user devices. If a response has not been received, then the authenticator computing device determines whether the timer has elapsed 325 and if the time has elapsed, the user device requesting access, or another user device of the plurality of users devices, may be denied access to the resource 345. Alternatively, if a response to the authentication challenge has been received from one of the user devices in the subset of user devices, then the authenticator computing device will determine whether the response is a valid response to the authentication challenge 335. If the response is not a valid response to the authentication challenge, then the user device requesting access, or another user device, may be denied access to the resource 345. Alternatively, if the response to the authentication challenge is determined to be valid, thereby constituting a valid response, then the authenticator computing device may determine whether all required responses have been received and validated 340. If all the responses have not been received and validated, then the authenticator computing system will continue to wait until all the required responses have been received and validated or until the maximum time for the responses has expired. Alternatively, if all the responses have been received and validated, then the user device requesting access, or another user device, may be granted access to the resource 350.

In a particular embodiment, a forwarding policy for the authenticator computing device and a forwarding policy for each of the plurality of user devices can be used to determine the subset of user devices that will receive the authentication challenge. As such, the forwarding policy of the authenticator computing device may cause the authenticator computing device to forward the authentication challenge to each of the user devices in the subset of user devices, or alternatively, the forwarding policy may cause the authenticator computing device to forward the authentication challenge to only some of the user devices in the subset. Additionally, the forwarding policy of each of the user devices may cause the user device to forward a received authentication challenge to other user devices.

Additionally, each of the plurality of user devices may utilize a response policy to determine whether or not the user device is required to generate a response to a received authentication challenge. As such, a response policy of the user device may determine whether or not the user device is required to generate a response to the authentication challenge. In addition, the authenticator computing device may utilize a validation policy to determine which responses are required to be valid to grant access to the user devices. As such, the validation policy of the authenticator computing device may determine which responses from the subset of user devices are required to be valid to constitute a valid response to the authentication challenge. Accordingly, the validation policy may cause the authenticator computing device to ignore the responses from some of the user devices and to require valid responses from other user devices.

It is within the scope of the present invention to make changes to the previously described policies in order to implement specific desired functionality into the authentication system.

In a specific embodiment providing anonymous authentication, the requesting client device 105A is associated with more than one user and the requesting device is a member of an associated set of user devices. In this embodiment, access to the resource is granted or denied to the associated set of user devices if the responses are determined to be valid responses.

Figure 8:
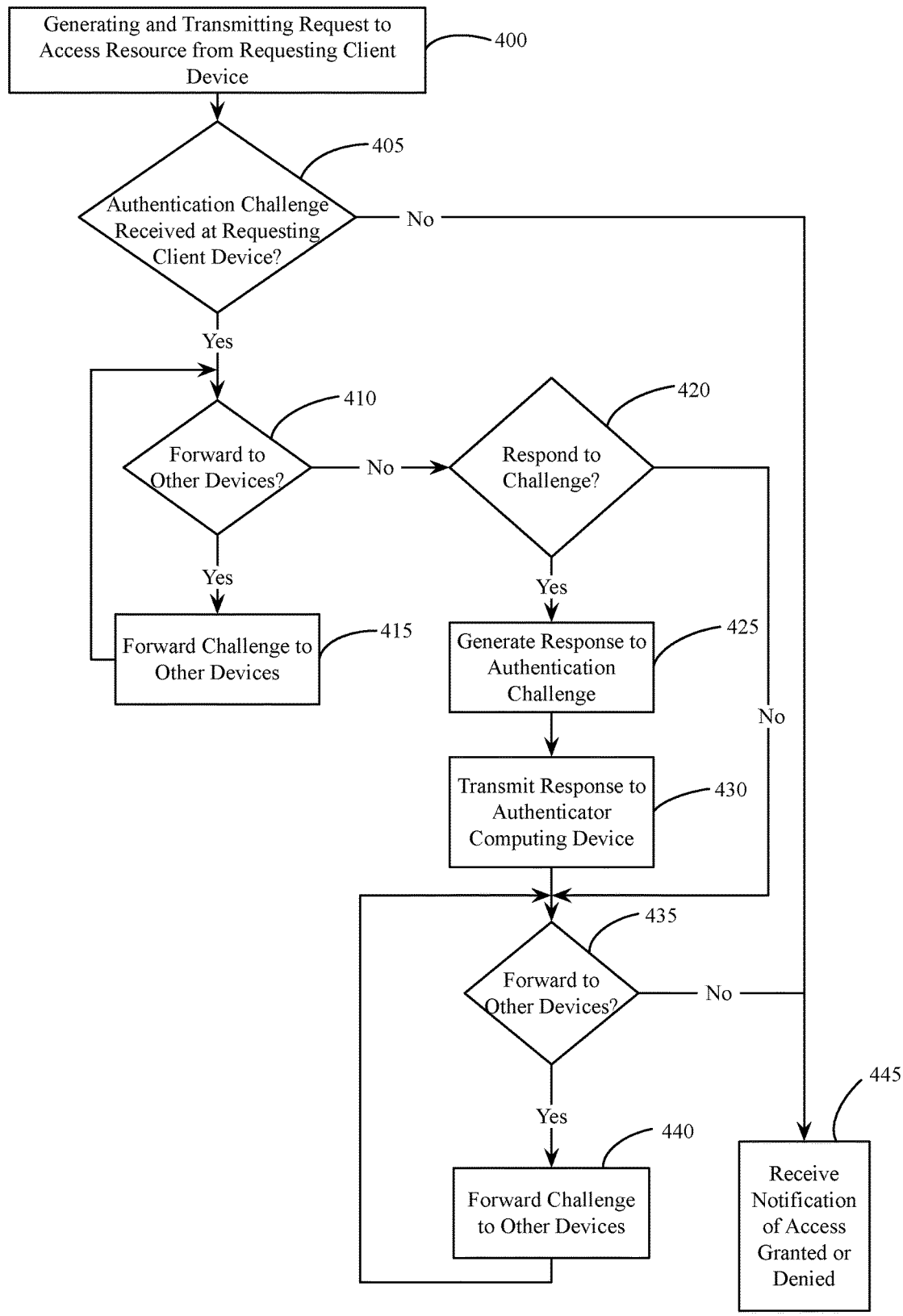
FIG. 8 is a flow diagram illustrating an example functionality implemented as a portion of the authentication system, in accordance with an embodiment of the present invention.

With reference to FIG. 8, shown is a flow chart that provides one example of functionality implemented in the requesting client device 105A. Alternatively, the flow chart of FIG. 8 can be viewed as depicting steps of an example of a method implemented in the requesting client device 105A to authenticate the requesting client device 105A using at least one verifying client 105B. Specifically, the requesting application 155 of the first device (client device 105A) generates a request to access a resource and sends the authenticator computing device 103 the request to access a resource 400. In response to the request from the requesting client device 105A, the authenticator computing device 103 generates an authentication challenge and transmits the authentication challenge to either the requesting client device 105A or the verifying client device 105B. If it is determined that the authentication challenge is received at the requesting client device 405, then the requesting client device may proceed by transmitting the authentication challenge to at least one verifying client device 410. Alternatively, if the authentication challenge is not received at the requesting client device, then the requesting client device would not be required to forward the authentication challenge to other devices and the requesting client device 105A may wait to receive notification of access granted or denied 445 based upon the authentication challenge responses from the other verifying client devices 105B. Additionally, the authentication challenge may instead be transmitted directly from the authenticator computing device 103 to the verifying client device 105B. After at least one verifying client device 105B has received the authentication challenge from either the authenticator computing device 103 or the requesting client device 105, the method proceeds at step 410, where it is determined whether the requesting client device 105A or the verifying client device 105B needs to forward the authentication challenge to another device before responding to the authentication challenge. In this regard, the requesting client device 105A and/or the verifying client device 105B can be required to transmit the authentication challenge to multiple devices at varying times to receive access to the resources. If it is determined that the requesting client device 105A or the verifying client device 105B needs to send the authentication challenge to another device, the requesting client device 105A or the verifying client device 105B forwards the authentication challenge to another device 415. If it is determined that the requesting device 105A or the verifying client device 105B does not need to send the authentication challenge to any other devices, then it is determined whether the devices receiving the authentication challenge need to respond to the authentication challenge 420. If so, the devices receiving the authentication challenge generate a response to the authentication challenge 425 and transmit the response to the authenticator computing device 430. The method then determines whether it is necessary to forward the authentication challenge to any other devices 435, and if it is necessary to forward the authentication challenge to another device, then the authentication challenge is forwarded to the other devices 440. The process continues until all of the appropriate devices have received the authentication challenge and all of the devices have had the opportunity to respond. The authenticator computing device 103 then determines whether or not to grant access to the requesting client device 105A and notifies the requesting client device 105A that access has been denied or granted 445.

In a specific embodiment providing anonymous authentication, the requesting client device 105A is associated with more than one user and the requesting device is a member of an associated set of user devices. In this embodiment, access to the resource is granted or denied 445 to all of the users of the associated set of user devices if the responses are determined to be valid responses.

Figure 9:
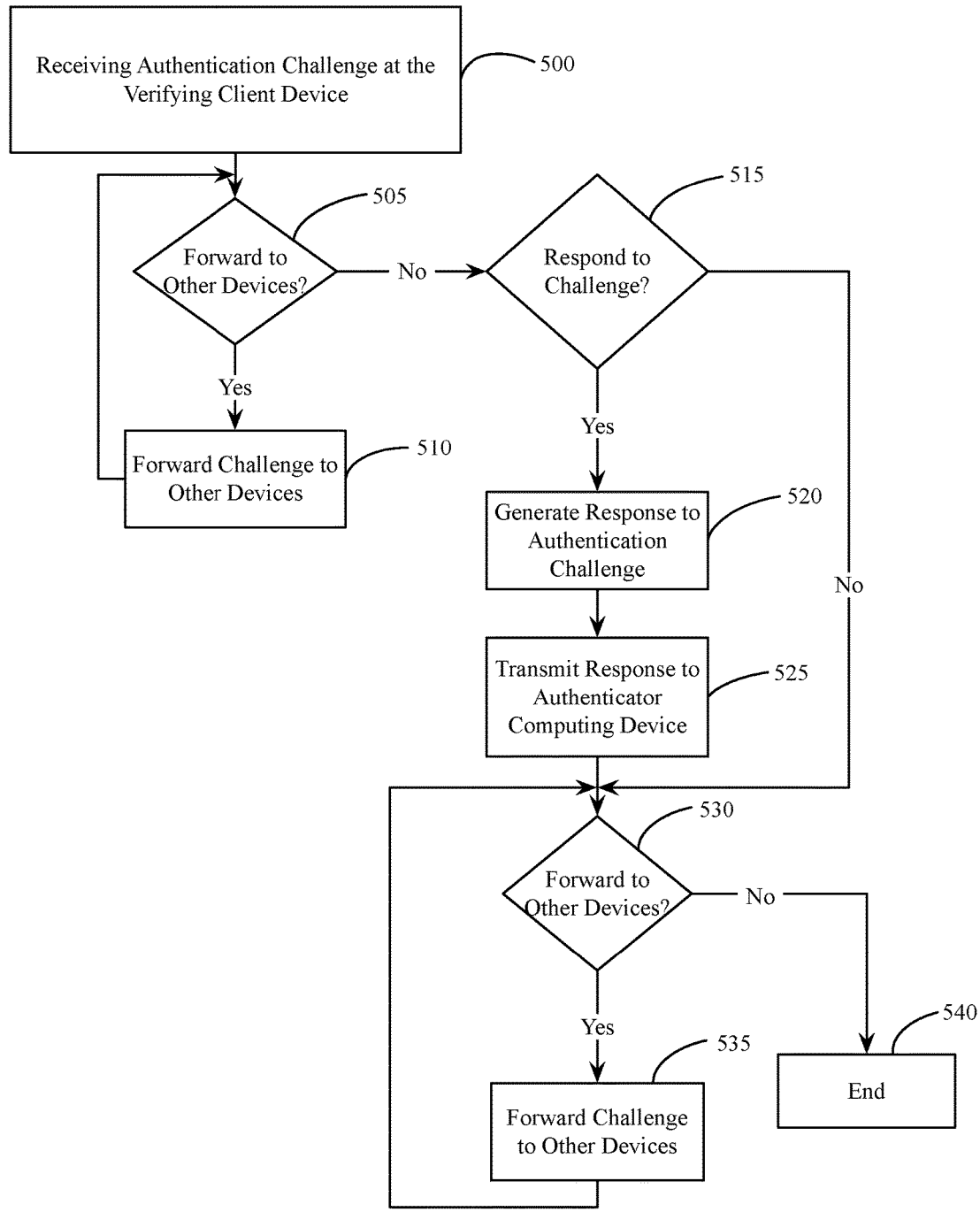
FIG. 9 is a flow diagram illustrating an example functionality implemented as a portion of the authentication system, in accordance with an embodiment of the present invention.

With reference to FIG. 9, shown is a flow chart that provides one example of functionality implemented in the verifying client device 105B. Alternatively, the flow chart of FIG. 9 can be viewed as depicting steps of an example of a method implemented in the verifying client device 105B to authenticate the requesting client device 105A. In particular, the verifying client device can receive the authentication challenge 500, wherein the authentication challenge may be received from the authenticator computing device 103 or from the requesting client device 105A. After receiving the authentication challenge at the verifying client device, the method continues by determining whether the authentication challenge should be forwarded to any other devices from the verifying client device 505. If it is determined that the authentication challenge should not be forwarded to any other devices, it is then determined whether the verifying client device 105B needs to respond to the authentication challenge 515. If not, then the method continues by determining whether any other devices should receive the authentication challenge 530. Alternatively, if it is determined that that the verifying client device 105B needs to respond to the authentication challenge, then a response is generated 520 and then transmitted to the authenticator computing device 525. The method then continues by determining whether any additional devices should receive the authentication challenge 530 and sending the authentication challenge to additional devices, if appropriate 535. The process continues until all of the appropriate devices have received the authentication challenge. The process then ends and the authenticator computing device notifies the requesting client device 105A whether or not access has been granted based at least in part on the method performed within the verifying client device 105B. In some embodiments, multiple verifying client devices 105B can be required to receive and/or send the authentication challenge at various times to authenticate the requesting client device 105A.

In a specific embodiment providing anonymous authentication, the requesting client device 105A is associated with more than one user and the requesting device is a member of an associated set of user devices. In this embodiment, the process ends and the authenticator computing device notifies the associated set of user devices 160 whether or not access to the resource is granted or denied to all of the users of the associated set of user devices if the responses are determined to be valid responses.

Figure 10:
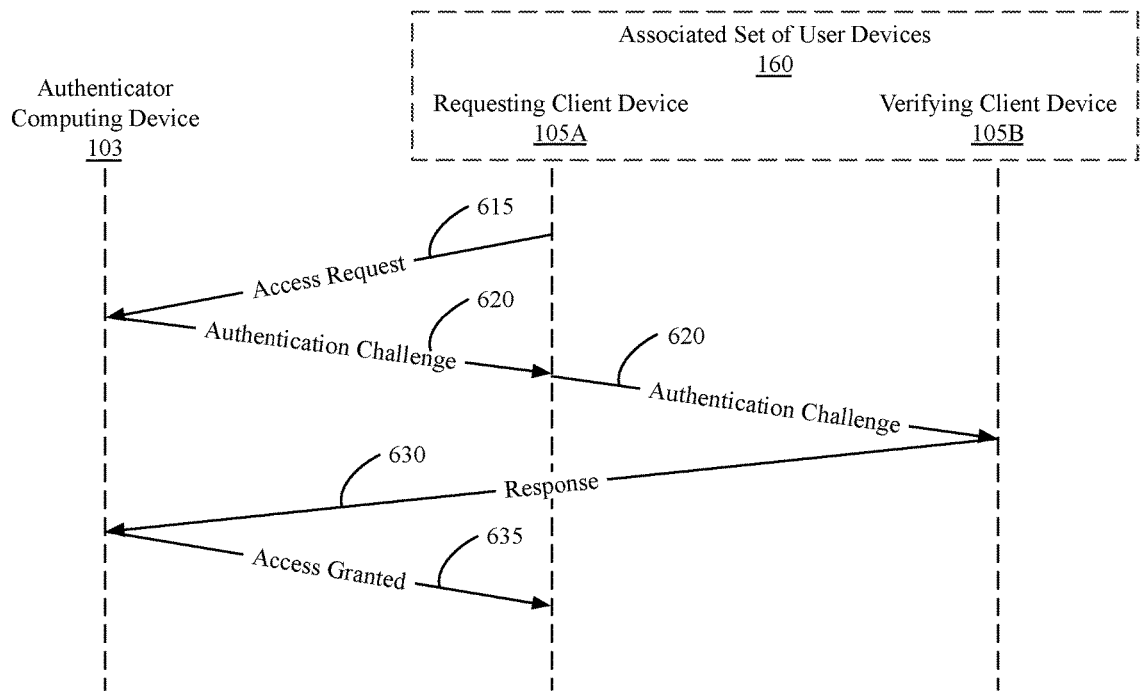
FIG. 10 is a diagram illustrating an example of authentication protocols implemented as a portion of the authentication system, in accordance with an embodiment of the present invention.

With reference to FIG. 10, shown is a diagram illustrating an example of an authentication protocol implemented as a portion of the embodiment of the authentication system. In one embodiment, the requesting client device 105A and verifying client device 105B shown in FIG. 10 are associated and/or registered to the same user. In an additional embodiment providing anonymous authentication, at least one of the requesting client device 105A and the verifying client device 105B are registered to more than one user and the requesting client device 105A and the verifying client device 105B are members of an associated set of user devices. As shown in FIG. 6, a requesting application in the requesting client device 105A sends an access request 615 to the authenticator computing device 103 to access a resource. The authenticator 103 sends an authentication challenge 620 to the requesting client device 105A after which the requesting client device 105A sends the authentication challenge 620 to a verifying client device 105B. The verifying client device 105B sends a response 630 back to the authenticator computing device 103. If the authenticator computing device 103 determines that the response 630 is valid for the issued authentication challenge 620, the authenticator computing device 103 grants the requesting client device 105A access 635 to the resource. In the case of anonymous authentication, if the authenticator computing device 103 determines that the response 630 is valid for the issued authentication challenge 620, the authenticator computing device 103 grants any one or more of the user devices of the associated set of user devices 160 access to the resource.

Figure 11:
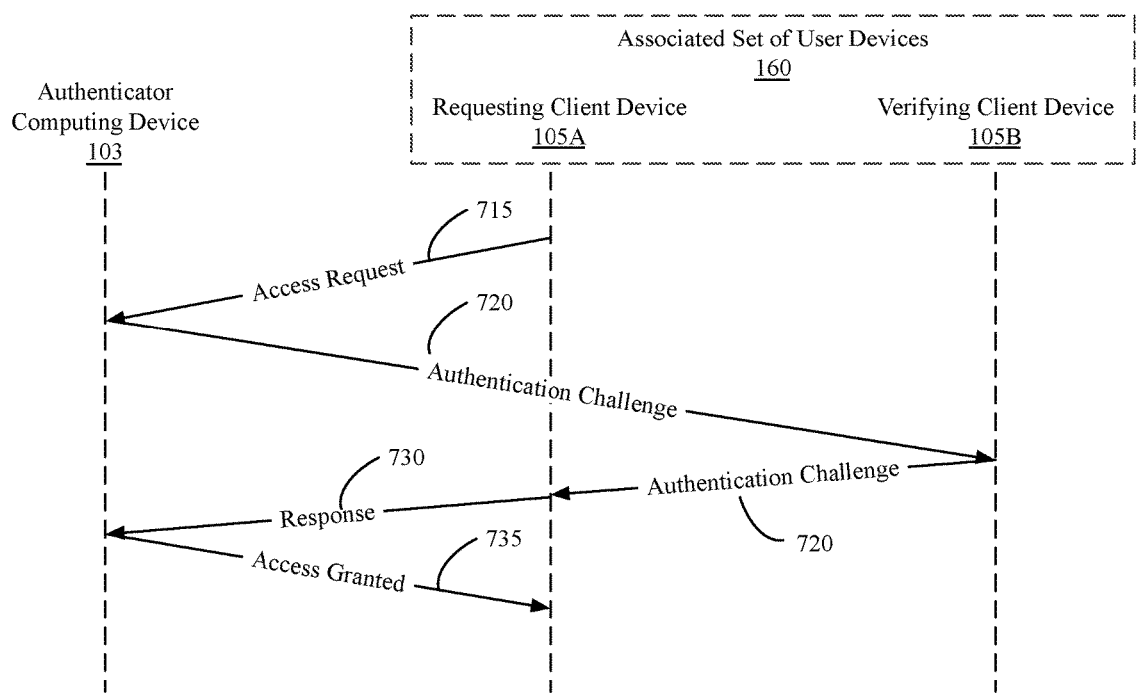
FIG. 11 is a diagram illustrating an example of authentication protocols implemented as a portion of the authentication system, in accordance with an embodiment of the present invention.

With reference to FIG. 11, shown is a diagram illustrating another example of an authentication protocol implemented as a portion of the embodiment of the authentication system. In one embodiment, the devices 105A and 105B shown in FIG. 11 are associated and/or registered to the same user. In an additional embodiment providing anonymous authentication, at least one of the requesting client device 105A and the verifying client device 105B are registered to more than one user and the requesting client device 105A and the verifying client device 105B are members of an associated set of user devices. In the embodiment shown in FIG. 11, after the requesting client device 105A requests access to a resource 715, the authenticator computing device 103 sends the authentication challenge 720 to the verifying client device 105B. The verifying client device 105B sends the authentication challenge 720 to the requesting client device 105A, after which the requesting client device 105A sends a response 730 back to the authenticator computing device 103. If the authenticator computing device 103 determines that the response 730 is valid for the issued authentication challenge 720, the authenticator computing device 103 grants the requesting client device 105A access 735 to the resource. In the case of anonymous authentication, if the authenticator computing device 103 determines that the response 730 is valid for the issued authentication challenge 720, the authenticator computing device 103 grants any one or more of the user devices of the associated set of user devices 160 access to the resource.

Figure 12:
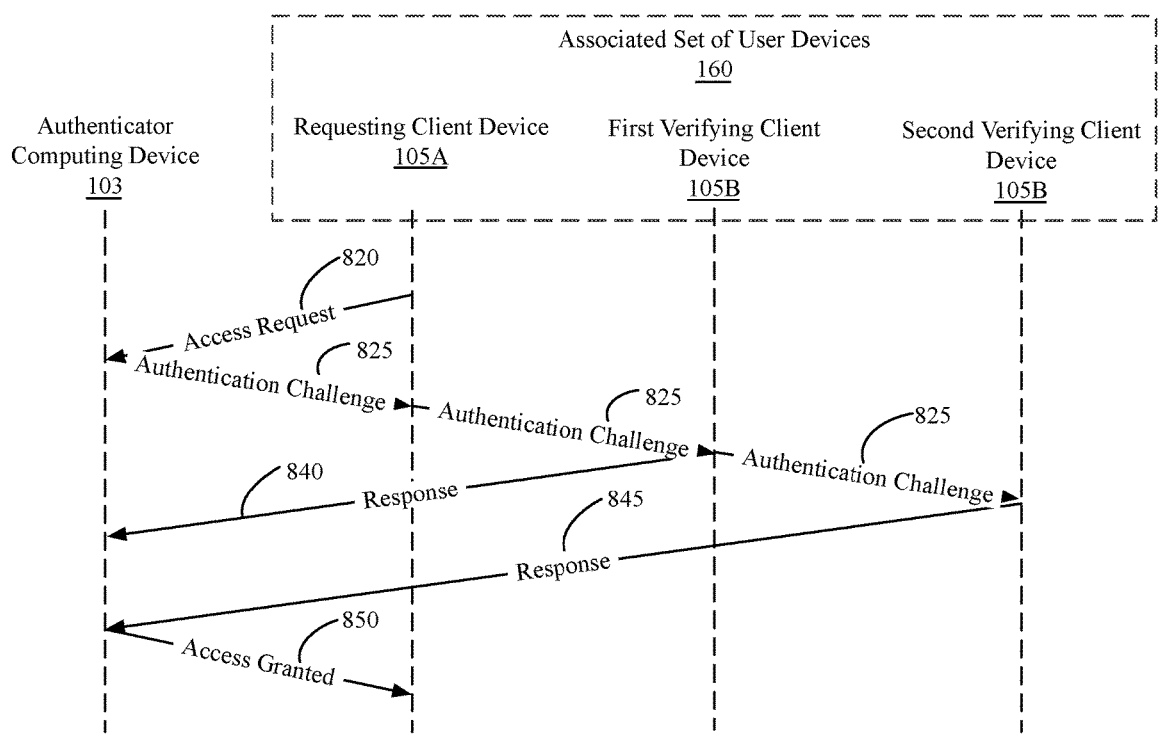
FIG. 12 is a diagram illustrating an example of authentication protocols implemented as a portion of the authentication system, in accordance with an embodiment of the present invention.

With reference to FIG. 12, shown is a diagram illustrating another example of an authentication protocol implemented as a portion of the embodiment of the authentication system. In one embodiment, the requesting client device 105A, first verifying device 105B and second verifying client device 105B, shown in FIG. 8, are associated and/or registered to the same user. In an additional embodiment providing anonymous authentication, at least one of the requesting client device 105A the first verifying client device 105B and the second verifying client device 105B are registered to more than one user and the requesting client device 105A the first verifying client device 105B and the second verifying client device 105B are members of an associated set of user devices. As shown in FIG. 12, the requesting client device 105A sends an access request 820 to the authenticator computing device 103. The requesting client device 105A that requests access to a resource receives the authentication challenge 825 from the authenticator computing device 103. A first verifying client device 105B receives the authentication challenge 825 from the requesting client device 105A. Thereafter, the first verifying client device 105B sends a response 840 back to the authenticator computing device 103. Thereafter, the first verifying client device 105B sends the authentication challenge 825 to a second verifying client device 105B. The second verifying client device 105B then sends a response 845 back to the authenticator computing device 103. If the authenticator computing device 103 determines that the responses 840, 845 received from the first and second verifying client devices 105B are valid for the issued authentication challenge 825, the authenticator computing device 103 sends an access grant 850 to the requesting client device 105A thereby granting the requesting client device 105A access to the resource. In the case of anonymous authentication, if the authenticator computing device 103 determines that the responses 840, 845 are valid for the issued authentication challenge 825, the authenticator computing device 103 grants any one or more of the user devices of the associated set of user devices 160 access to the resource.

Figure 13:
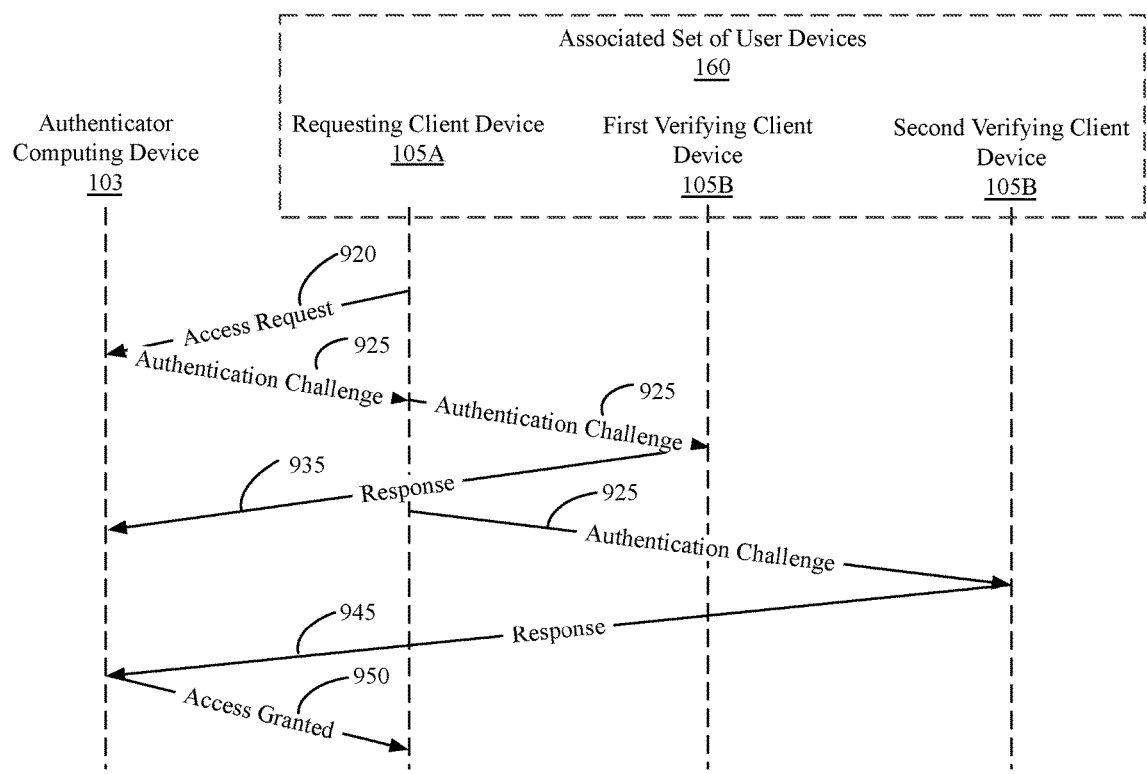
FIG. 13 is a diagram illustrating an example of authentication protocols implemented as a portion of the authentication system, in accordance with an embodiment of the present invention.

With reference to FIG. 13, shown is a diagram illustrating another example of an authentication protocol implemented as a portion of the embodiment of the authentication system. In one embodiment, the requesting client device 105A, first verifying device 105B and second verifying client device 105B, shown in FIG. 13, are associated and/or registered to the same user. In an additional embodiment providing anonymous authentication, at least one of the requesting client device 105A the first verifying client device 105B and the second verifying client device 105B are registered to more than one user and the requesting client device 105A the first verifying client device 105B and the second verifying client device 105B are members of an associated set of user devices. As shown in FIG. 13, the requesting client device 105A sends an access request 920 to the authenticator computing device 103. The requesting client device 105A sends the authentication challenge 925 to the first verifying client device 105B, after which the first verifying client device 105B sends a response 935 to the authenticator computing device 103. The requesting client device 105A then sends the authentication challenge 925 to the second verifying client device 105B. The second verifying client device 105B then sends a response 945 back to the authenticator computing device 103. If the authenticator computing device 103 determines that the responses 935, 945 received from the first and second verifying client devices 105B are valid for the issued authentication challenge 925, the authenticator computing device 103 send an access grant 950 to the requesting client device 105A, thereby granting access to the resource. In the case of anonymous authentication, if the authenticator computing device 103 determines that the responses 935, 945 are valid for the issued authentication challenge 925, the authenticator computing device 103 grants any one or more of the user devices of the associated set of user devices 160 access to the resource.

Figure 14:
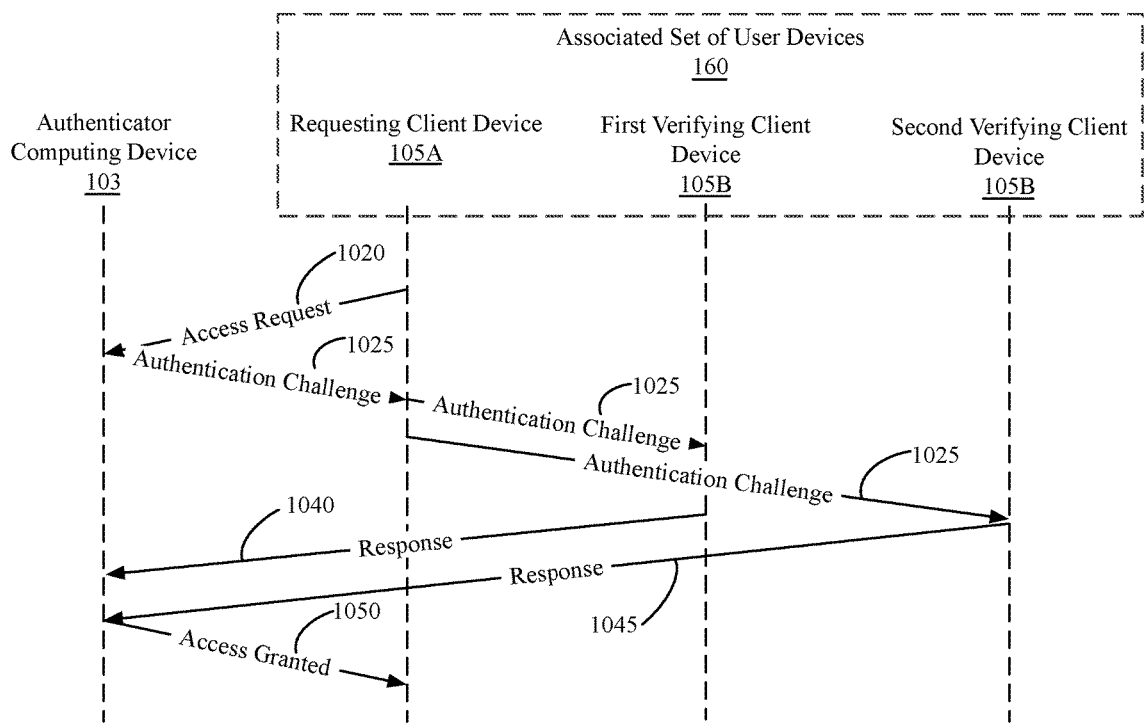
FIG. 14 is a diagram illustrating an example of authentication protocols implemented as a portion of the authentication system, in accordance with an embodiment of the present invention.

With reference to FIG. 14, shown is a diagram illustrating another example of an authentication protocol implemented as a portion of the embodiment of the authentication system 100. In one embodiment, the requesting client device 105A, first verifying device 105B and second verifying client device 105B, shown in FIG. 14, are associated and/or registered to the same user. In an additional embodiment providing anonymous authentication, at least one of the requesting client device 105A the first verifying client device 105B and the second verifying client device 105B are registered to more than one user and the requesting client device 105A the first verifying client device 105B and the second verifying client device 105B are members of an associated set of user devices. As shown in FIG. 14, the requesting client device 105A first sends an access request 1020 to the authenticator computing device 103. The requesting computing device 105A then receives an authentication challenge 1025 and sends the authentication challenge 1025 to the first verifying client device 105B, then to the second verifying client device 105B, after which both the first and the second verifying client devices 105B send a response 1040, 1045 to the authenticator computing device 103. If the authenticator computing device 103 determines that the responses 1040, 1045 received from the first and second verifying client devices 105B are valid for the issued authentication challenge 1025, the authenticator computing device 103 sends an access grant 1050 to the requesting client device 105A thereby granting the requesting client device 105A access to the resource. In the case of anonymous authentication, if the authenticator computing device 103 determines that the responses 1040, 1045 are valid for the issued authentication challenge 1025, the authenticator computing device 103 grants any one or more of the user devices of the associated set of user devices 160 access to the resource.

In one embodiment, when the authentication process starts, a nonce and/or a QR-code version of this nonce can be generated by the server. Once the nonce is generated, the QR code can be generated. Finally, the server can send the created QR code to the device 105 requesting access to the application. In one embodiment, to forestall attacks during the authentication process, the authentication challenge can only be valid for about 15 seconds. It should be appreciated that the authentication challenge can be limited to being valid for any pre-determined amount of time.

All the communications between the authenticator computing device 103 and the devices 105 can be signed, encrypted, and/or contain a timestamp. There can be a time window (determined from the timestamp) within which the receiver of a message will accept a message. The timestamp and the digital signature can facilitate ensuring the authenticity, integrity, and non-repudiation of the message. The encryption can facilitate ensuring the confidentiality of the message. Also, an email address or other identifier can be used to identify the user and the signature to differentiate the two devices 105.

The interaction between the requesting client device 105A and the verifying client device 105B can be modified to suit different purposes. For example, the authentication challenge data could be sent as a sound wave instead of a QR code. In this regard, different forms of authentication challenges can be transmitted to the device 105A requesting access to the application and received from the devices 105B interacting with the requesting device 105A to authenticate the requesting device 105A. For example, the authentication challenge can be a nonce and may be communicated in the form of a sound wave, NFC, images, infrared rays, vibration, Bluetooth, the state of a memory device such as a USB drive or magnetic tape, or any form of communication between devices 105 that can be received via the devices 105.

The time limit set to perform the authentication challenge, and a timestamp that may optionally be included in all the communications, can improve the security of the present invention. If the communication of the authentication challenge is delayed by a third party (perhaps because the attacker is in possession of the requesting client device 105A, while a verifying client device 105B is in possession of a legitimate user, and the attacker uses social engineering or spear phishing to send the authentication challenge data to said verifying client device 105B), timestamps can reveal that delay.

In an additional embodiment, continuous authentication can be provided, wherein, after a requesting client device 105A gains access to the resource, the requesting client device 105A is stolen, which would allow an attacker to gain access to the resource. To solve this problem, the authenticator computing device 103 can send a challenge to the requesting device 105A in a fixed or random time interval. The user of the requesting device 105A is then required to respond to the authentication challenges in order to continue being authenticated. The authentication system can require the challenge to be performed in a relatively small time interval, requiring the user to continuously respond to the authentication challenge in order to stay authenticated. Furthermore, the authentication system can generate different challenges, and/or it can request responses from a different subset of the devices associated with the user.

Additionally, while the detailed embodiments of the invention describe authenticating only the requesting client device 105A, granting the verifying client devices 105B access to the resource is also within the scope of the present invention.

In some embodiments, if one of the client devices 105 is unable to communicate directly with the authenticator computing device 103, it is possible to use one of the other client devices 105, that can communicate with the authenticator computing device 103, to act as a relay for the communication between the authenticator computing device 103 and the client device 105 unable to communicate directly with the authenticator computing device 103.

Figure 15:
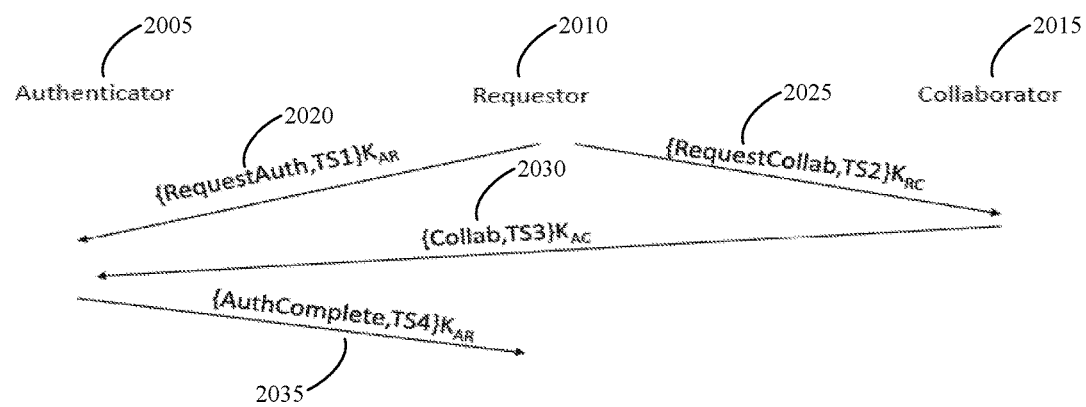
FIG. 15 is a diagram illustrating an example of a symmetric-key coauthentication protocol without authenticator challenges, in accordance with an embodiment of the present invention.

In additional embodiments, the challenge-response process previously described may be avoided by having the requester send two requests, one to the authenticator computing device (authenticator), to request authentication, and another to the verifying client device (collaborator), to request verification. In one such embodiment, the authenticator A and requestor R share a secret key $K_{AR}$, and the authenticator A and collaborator C share a secret key $K_{AC}$. FIG. 15 illustrates an exemplary embodiment of a symmetric-key coauthentication without an authenticator challenge, wherein the requesting client device (requestor) 2010 and the authenticator 2005 share a secret key $K_{AR}$, the authenticator 2005 and the collaborator 2015 share a secret key $K_{AC}$, and the requestor 2010 and collaborator 2015 share a secret key $K_{RC}$. In this embodiment, the requestor 2010 sends its two requests, one 2020 to the authenticator 2005, encrypted with key $K_{AR}$, and another 2025 to the collaborator 2015, encrypted with key $K_{RC}$, possibly with the same or different timestamps TS1 and TS2. By including timestamps in all the messages, the participating machines can verify the freshness of every message received, wherein freshness means that the timestamp has not been used before (at least by the device from which the timestamp is received, to prevent replay attacks) or falls within an allowed window of time, for example the past 15 seconds. The collaborator 2015 responds by sending a participation message 2030 back to the authenticator 2005, encrypted with key $K_{AC}$. After verifying that both the requestor 2010 and the collaborator 2015 have participated in an authentication by sending fresh, properly encrypted messages 2020 and 2030, the authenticator 2005 then sends a notification 2035 to the requestor 2010 that it has been successfully authenticated. Message authentication codes (MACs) or other encodings may take the place of full symmetric-key encryptions, as long as the authenticator 2005 can verify participation of both the requestor 2010 and collaborator 2015.

Figure 16:
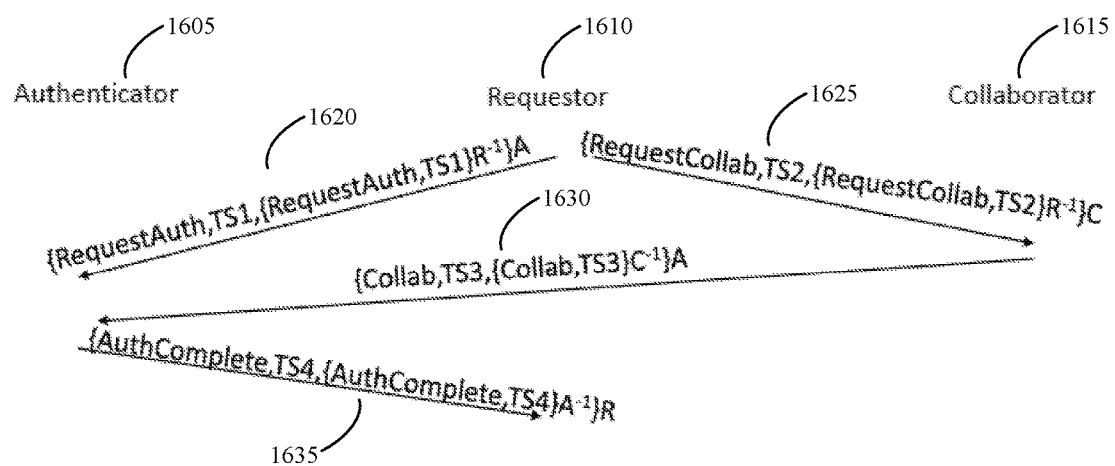
FIG. 16 is a diagram illustrating an example of an asymmetric-key coauthentication protocol without authenticator challenges, in accordance with an embodiment of the present invention.

FIG. 16 illustrates an exemplary embodiment of a coauthentication protocol that avoids authenticator challenges and can be implemented with asymmetric-cryptographic operations. In this public-key version of the coauthentication protocol shown in FIG. 16, the authenticator 1605 has public key A and private key $A^{-1}$, the requestor 1610 has public key R and private key $R^{-1}$, and the collaborator 1615 has public key C and private key $C^{-1}$. Throughout public-key communications, as shown in FIG. 16, when preparing a message M to be sent, a sender S may sign M with its private key $S^{-1}$, to obtain $\{M\}S^{-1}$, and then encrypt message M and this digital signature with a public key of the intended recipient I, to obtain $\{M, \{M\}S^{-1}\}I$. As such, in this embodiment, the requestor 1610 sends its two encrypted requests, one 1620 to the authenticator 1605 and another 1625 to the collaborator 1615. The collaborator 1615 responds by sending an encrypted participation message 1630 back to the authenticator 1605. After verifying that both the requestor 1610 and the collaborator 1615 have participated in an authentication by sending fresh, properly signed messages 1620 and 1630, the authenticator 1605 sends a notification 1635 to the requestor 1610 that it has been successfully authenticated.

Figure 17:
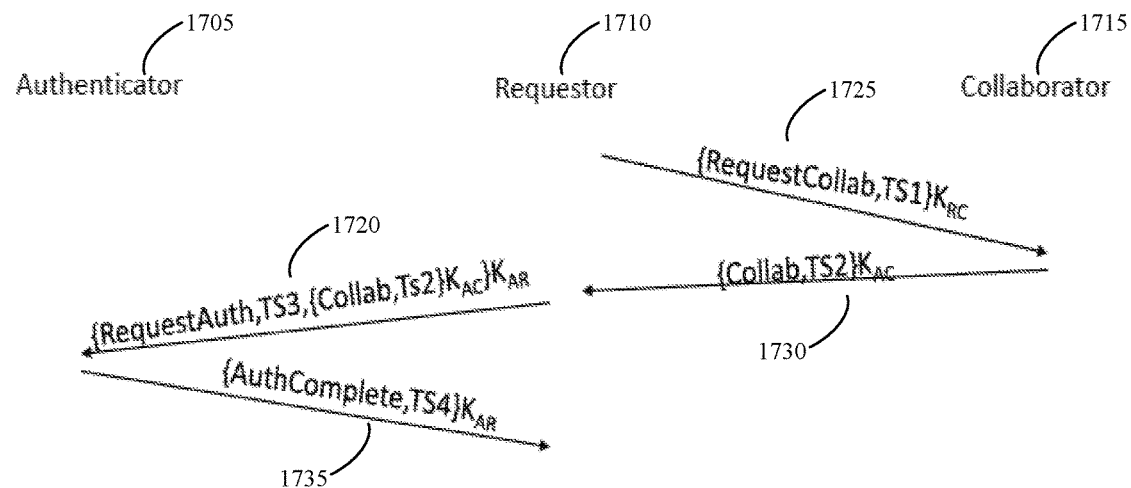
FIG. 17 is a diagram illustrating an example of a symmetric-key coauthentication protocol without authenticator challenges and wherein the requester forwards the collaborator's participation message to the authenticator, in accordance with an embodiment of the present invention.

As with the variations previously described, it is possible for one device to forward the messages of another device to the authenticator. In FIG. 17, the requestor 1710 forwards the collaborator's participation message 1730 to the authenticator 1705. FIG. 17 illustrates the requestor 1710 sending a request 1725 to the collaborator 1715, the collaborator responding by sending the requestor 1710 a participation message 1730, and the requestor 1710 then forwarding the collaborator's participation message 1730 to the authenticator 1705, by embedding the collaborator's participation message 1730 into another message 1720 already being sent from the requestor 1710 to the authenticator 1705, to request authentication. The authenticator 1705 then sends a notification 1735 to the requestor 1710 that it has been successfully authenticated.

Figure 18:
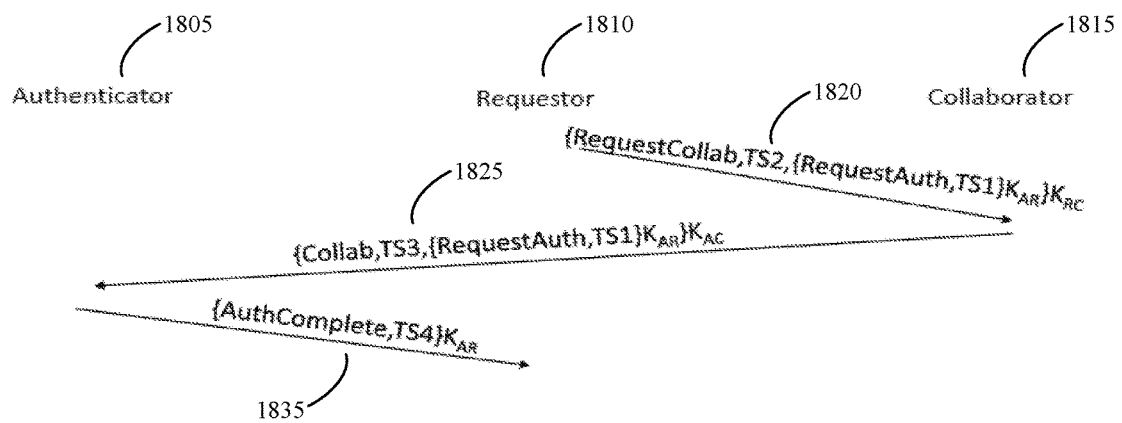
FIG. 18 is a diagram illustrating an example of a symmetric-key coauthentication protocol without authenticator challenges and wherein the collaborator forwards the requestor's first request message to the authenticator, in accordance with an embodiment of the present invention.

FIG. 18 illustrates the collaborator 1815 forwarding the requestor's authentication request message, embedded in its request for collaboration 1820, to the authenticator 1805. In this embodiment, the requestor 1810 sends a request for collaboration 1820, including a request for authentication intended for the authenticator 1805, to the collaborator 1815 and the collaborator 1815 then forwards the requestor's request for authentication to the authenticator 1805 as part of the collaborator's participation message 1825. The authenticator 1805 then sends a notification 1835 to the requestor 1810 that it has been successfully authenticated. The protocol of FIG. 18 is also interesting because it minimizes the messages needed to perform coauthentication.

In general, coauthentication protocols that avoid the challenge-response process are expected to be more efficient than the challenge-response protocols, due to the omission of challenge creation and the parallelization or batching of some of the communications (e.g., the authentication and collaboration requests).

All the coauthentication protocols can be generalized in numerous ways. For example, all protocols shown to operate with two devices (e.g., requestor and collaborator) may be generalized to operate with additional devices. Some devices may be shared by a plurality of users, and a plurality of users may be coauthenticated simultaneously. By combining elements of various embodiments, challengeless coauthentication can implement anonymous coauthentication, and challengeless coauthentication may require participation of m-out-of-n devices. Importantly, updates to any of the data used in the communication protocols, such as shared secret keys or public keys, may be incorporated into the protocols. Other elements such as timestamps may be omitted, and other features added, such as message sequence numbers, source and destination addresses, device or user identifiers, location data, parameters, or application-level data.

Figure 19:
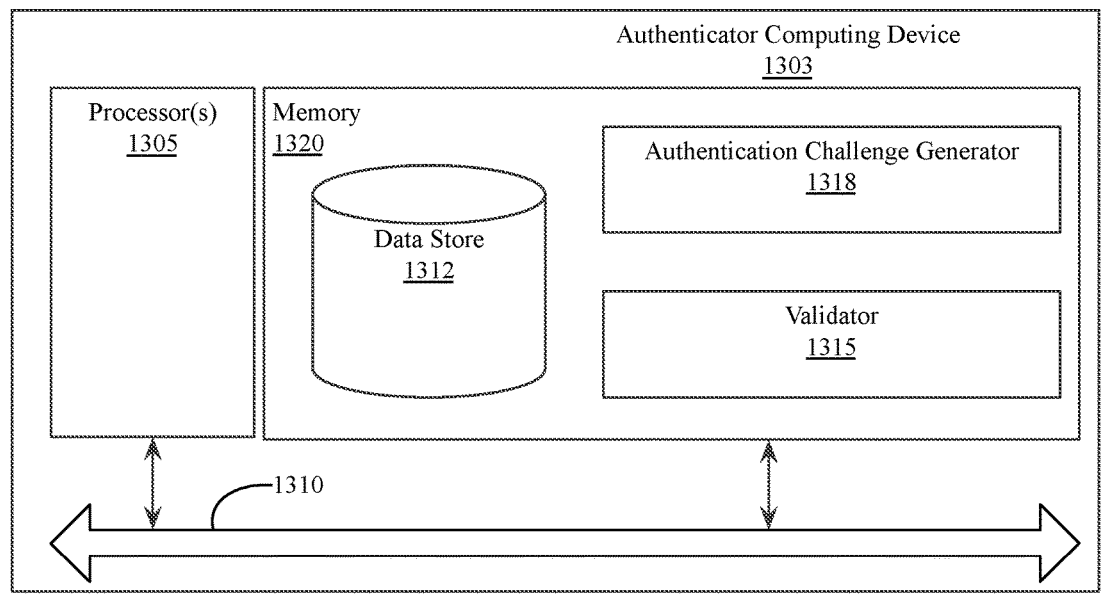
FIG. 19 is a schematic block diagram illustrating an exemplary device employed in the networked environment of the authentication system, in accordance with an embodiment of the present invention.

With reference to FIG. 19, shown is a schematic block diagram of an authenticator computing device 1303 according to an embodiment of the present disclosure. The authenticator computing device 1303 includes at least one processor circuit, for example, having a processor 1305 and a memory 1320, both of which are coupled to a local interface 1310. To this end, the authenticator computing device 1303 can comprise, for example, at least one server computer. The local interface 1310 can comprise, for example, a data bus with an accompanying address/control bus or other bus structure as can be appreciated.

Stored in the memory 1320 are both data and several components that are executable by the processor 1305. In particular, stored in the memory 1320 and executable by the processor 1305 are the authentication challenge generator 1318, validator 1315, and potentially other applications. Also stored in the memory 1320 can be a data store 1312 and other data. In addition, an operating system can be stored in the memory 1320 and executable by the processor 1305.

It is understood that there can be other applications that are stored in the memory 1320 and are executable by the processors 1305 as can be appreciated. Where any component discussed herein is implemented in the form of software, any one of a number of programming languages can be employed such as, for example, C, C++, C#, Objective C, ML, Erlang, F#, x86, ARM, Java, JavaScript, Perl, PHP, Visual Basic, Python, Ruby, Delphi, Matlab, or other programming languages.

A number of software components are stored in the memory 1320 and are executable by the processor 1305. In this respect, the term "executable" means a program file that is in a form that can ultimately be run by the processor 1305. Examples of executable programs can be, for example, a compiled program that can be translated into machine code in a format that can be loaded into a random access portion of the memory 1320 and run by the processor 1305, source code that can be expressed in proper format such as object code that is capable of being loaded into a random access portion of the memory 1320 and executed by the processor 1305, or source code that can be interpreted by another executable program to generate instructions in a random access portion of the memory 1320 to be executed by the processor 1305, etc. An executable program can be stored in any portion or component of the memory 1320 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1320 is defined herein as including both volatile and nonvolatile memory and data storage components. Volatile components are those that do not retain data values upon loss of power. Nonvolatile components are those that retain data upon a loss of power. Thus, the memory 1320 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, the processor 1305 can represent multiple processors 1305 and the memory 1320 can represent multiple memories 1320 that operate in parallel processing circuits, respectively. In such a case, the local interface 1310 can be an appropriate network that facilitates communication between any two of the multiple processors 1105, between any processor 1305 and any of the memories 1320, or between any two of the memories 1320, etc. The local interface 1310 can comprise additional systems designed to coordinate this communication, including, for example, performing load balancing. The processor 1305 can be of electrical or of some other available construction.

Although authentication challenge generator 1318, validator 1315, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flow charts show the functionality and operation of an implementation of portions of an embodiment for the multiple device authentication system. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as a processor 1305 in a computer system or other system. The machine code can be converted from the source code, etc. If embodied in hardware, each block can represent a circuit or a number of interconnected circuits to implement the specified logical function(s).

Although the flow charts of show a specific order of execution, it is understood that the order of execution can differ from that which is depicted. For example, the order of execution of two or more blocks can be scrambled relative to the order shown. Also, two or more blocks shown in succession in can be executed concurrently or with partial concurrence. Further, in some embodiments, one or more of the blocks shown can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

What is claimed is:

1. A method of authentication, the method comprising:
   receiving, at an authenticator, an authentication request to access a resource, wherein the authentication request is generated by a requestor;
   receiving, at a collaborator, a verification request to access the resource,
   wherein the verification request is generated by the requestor and received from the requestor;

generating, at the collaborator, a participation message, wherein the participation message is generated in response to the verification request to access the resource received from the requestor and wherein the participation message is not generated in response to a challenge generated by the authenticator:

receiving, at the authenticator, the participation message generated by the collaborator in response to the verification request to access the resource generated by the requestor;

analyzing, at the authenticator computing device, the authentication request to access a resource and the participation message to determine whether the requestor should be granted access to the resource; and granting the requesting user access to the resource when it is determined that the requesting user should be granted access to the resource based upon the analysis of the authentication request to access a resource and the participation message.

2. The method of claim 1, wherein the authentication request to access a resource generated by the requestor is transmitted from the requestor to the authenticator and wherein the participation message generated by the collaborator is transmitted from the collaborator to the authenticator.

3. The method of claim 1, further comprising:
transmitting the participation message generated by the collaborator to the requestor; and
transmitting the participation message generated by the collaborator and the authentication request to access a resource generated by the requestor from the requestor to the authenticator in response to receiving the participation message at the requestor.

4. The method of claim 1, further comprising:
transmitting the authentication request to access a resource generated by the requestor to the collaborator; and
transmitting the authentication request to access a resource generated by the requestor and the participation message generated by the collaborator from the collaborator to the authenticator.

5. The method of claim 1, wherein the authenticator and the requestor share a secret authentication key, the requestor and the collaborator share a secret authentication key, or the authenticator and the collaborator share a secret authentication key.

6. The method of claim 1, wherein at least one of the authenticator, requestor, and collaborator has access to its own private key, in a system with public key communication.

7. The method of claim 1, wherein at least one of the keys accessible to the authenticator, requestor, or collaborator is updated as part of the sequence of communications.

8. The method of claim 1, wherein the authentication request to access a resource, the verification request to access a resource, or the participation message are encoded.

9. The method of claim 1, further comprising, an additional method of authentication including password authentication or biometric authentication of the requestor.

10. One or more non-transitory computer-readable media having computer-executable instructions for performing a method of running a software program on a computing device, the method including issuing instructions from the software program, the instructions comprising:
receiving, at an authenticator, a authentication request to access a resource generated by a requestor;

receiving, at a collaborator, a verification request to access a resource from the requestor;

generating, at a collaborator, a participation message, wherein the participation message is generated in response to the verification request to access the resource received from the requestor and wherein the participation message is not generated in response to a challenge generated by the authenticator receiving, at the authenticator, the participation message generated by the collaborator in response to the verification request to access a resource generated by the requestor;

analyzing, at the authenticator computing device, the authentication request to access a resource and the participation message to determine whether the requestor should be granted access to the resource; and granting the requesting user access to the resource when it is determined that the requesting user should be granted access to the resource based upon the analysis of the authentication request to access a resource and the participation message.

11. The one or more non-transitory computer-readable media of claim 10, wherein the authentication request to access a resource generated by the requestor is transmitted from the requestor to the authenticator and wherein the participation message generated by the collaborator is transmitted from the collaborator to the authenticator.

12. The one or more non-transitory computer-readable media of claim 10, further comprising instructions for:
transmitting the participation message generated by the collaborator to the requestor; and
transmitting the participation message generated by the collaborator and the authentication request to access a resource generated by the requestor from the requestor to the authenticator in response to receiving the participation message at the requestor.

13. The one or more non-transitory computer-readable media of claim 10, further comprising instructions for:
transmitting the authentication request to access a resource generated by the requester to the collaborator; and
transmitting the authentication request to access a resource generated by the requestor and the participation message generated by the collaborator from the collaborator to the authenticator.

14. An authentication system comprising:
an authenticator computing device configured to:
receive a authentication request to access a resource, wherein the authentication request is generated by a requestor;
receiving a participation message generated by a collaborator in response to a verification request to access a resource, wherein the verification request is generated by the requestor and received from the requestor and wherein the participation message is not generated in response to a challenge generated by the authenticator;
analyzing, at the authenticator computing device, the authentication request to access a resource and the participation message to determine whether the requestor should be granted access to the resource; and
grant the requesting user access to the resource when it is determined that the requesting user should be granted access to the resource based upon the analysis of the authentication request to access a resource and the participation message.

15. The authentication system of claim 14, wherein the authentication request to access a resource generated by the requestor is transmitted from the requestor to the authenticator and wherein the participation message generated by the collaborator is transmitted from the collaborator to the authenticator.

16. The authentication system of claim 14, wherein the participation message generated by the collaborator is transmitted from the collaborator to the requestor and wherein the participation message generated by the collaborator and the authentication request to access a resource generated by the requestor is transmitted from the requestor to the authenticator computing device.

17. The authentication system of claim 14, wherein the authentication request to access a resource generated by the requestor is transmitted from the requestor to the collaborator and wherein the authentication request to access a resource generated by the requestor and the participation message generated by the collaborator are transmitted from the collaborator to the authenticator computing device.

18. The authentication system of claim 14, wherein the authenticator and the requestor share a secret authentication key, the requestor and the collaborator share a secret authentication key, or the authenticator and the collaborator share a secret authentication key.

19. The authentication system of claim 14, wherein at least one of the authenticator, requestor, and collaborator has access to its own private key, in a system with public key communication.

20. The authentication system of claim 14, wherein at least one of the keys accessible to the authenticator, requestor, or collaborator is updated as part of the sequence of communications.

21. The authentication system of claim 14, wherein the authentication request to access a resource, the verification request to access a resource, or the participation message are encoded.

22. The authentication system of claim 14, wherein the authenticator computing device is further configured to authenticate based on additional data received, including a password or biometric data.

* * * * *